United States Patent
Kobayashi

(10) Patent No.: US 11,843,872 B2
(45) Date of Patent: Dec. 12, 2023

(54) IMAGING APPARATUS, FLICKER DETECTION METHOD, AND STORAGE MEDIUM

(71) Applicant: CANON KABUSHIKI KAISHA, Tokyo (JP)

(72) Inventor: Takashi Kobayashi, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/820,716

(22) Filed: Aug. 18, 2022

(65) Prior Publication Data
US 2023/0061655 A1    Mar. 2, 2023

(30) Foreign Application Priority Data
Aug. 31, 2021   (JP) ................................. 2021-141408

(51) Int. Cl.
*H04N 23/745* (2023.01)
*H04N 23/73* (2023.01)

(52) U.S. Cl.
CPC .......... *H04N 23/745* (2023.01); *H04N 23/73* (2023.01)

(58) Field of Classification Search
CPC ........................... H04N 23/745; H04N 23/73
See application file for complete search history.

(56) References Cited

U.S. PATENT DOCUMENTS

| | | |
|---|---|---|
| 2006/0221205 A1 | 10/2006 | Nakajima |
| 2014/0043501 A1 | 2/2014 | Lee |
| 2014/0192217 A1 | 7/2014 | Kim |
| 2020/0137291 A1 | 4/2020 | Ota |

FOREIGN PATENT DOCUMENTS

JP         2014220763 A       11/2014

*Primary Examiner* — Twyler L Haskins
*Assistant Examiner* — Angel L Garces-Rivera
(74) *Attorney, Agent, or Firm* — CANON U.S.A., INC. IP Division

(57) ABSTRACT

An apparatus includes a detection unit configured to detect a flicker frequency of a subject light source by sampling an output signal of a sensor in first sampling processing, a determination unit configured to determine whether the detected flicker frequency falls within a detection target range, by sampling an output signal of the sensor in second sampling processing, and a control unit configured to perform control to notify a user in response to determination by the determination unit that the detected flicker frequency falls out of a detection target range in the first sampling processing.

20 Claims, 23 Drawing Sheets

FIG.2

| Step (EV) | 1/4 | | | |
|---|---|---|---|---|
| Index (i) | 1 | 2 | 3 | 4 |
| SHUTTER SPEED (SEC) | 1/8192.0 | 1/6888.6 | 1/5792.6 | 1/4871.0 |

| Step (EV) | 1/8 EV | | | | |
|---|---|---|---|---|---|
| Index (i) | 5 | 6 | ... | 11 | 12 |
| SHUTTER SPEED (SEC) | 1/4096.0 | 1/3756.0 | ... | 1/2435.5 | 1/2233.4 |

| Step (EV) | 1/16 EV | | | | |
|---|---|---|---|---|---|
| Index (i) | 13 | 14 | ... | 27 | 28 |
| SHUTTER SPEED (SEC) | 1/2048.0 | 1/1961.2 | ... | 1/1116.7 | 1/1069.3 |

| Step (EV) | 1/32 EV | | | | |
|---|---|---|---|---|---|
| Index (i) | 29 | 30 | ... | 59 | 60 |
| SHUTTER SPEED (SEC) | 1/1024.0 | 1/1002.1 | ... | 1/534.7 | 1/523.2 |

| Step (EV) | 1/64 EV | | | | |
|---|---|---|---|---|---|
| Index (i) | 61 | 62 | ... | 123 | 124 |
| SHUTTER SPEED (SEC) | 1/512.0 | 1/506.5 | ... | 1/261.6 | 1/258.8 |

| Step (EV) | 1/128 EV | | | | |
|---|---|---|---|---|---|
| Index (i) | 125 | 126 | ... | 251 | 252 |
| SHUTTER SPEED (SEC) | 1/256.0 | 1/254.6 | ... | 1/129.4 | 1/128.7 |

| Step (EV) | 1/256 EV | | | | |
|---|---|---|---|---|---|
| Index (i) | 253 | 254 | ... | 599 | 600 |
| SHUTTER SPEED (SEC) | 1/128.0 | 1/127.7 | ... | 1/50.2 | 1/50.0 |

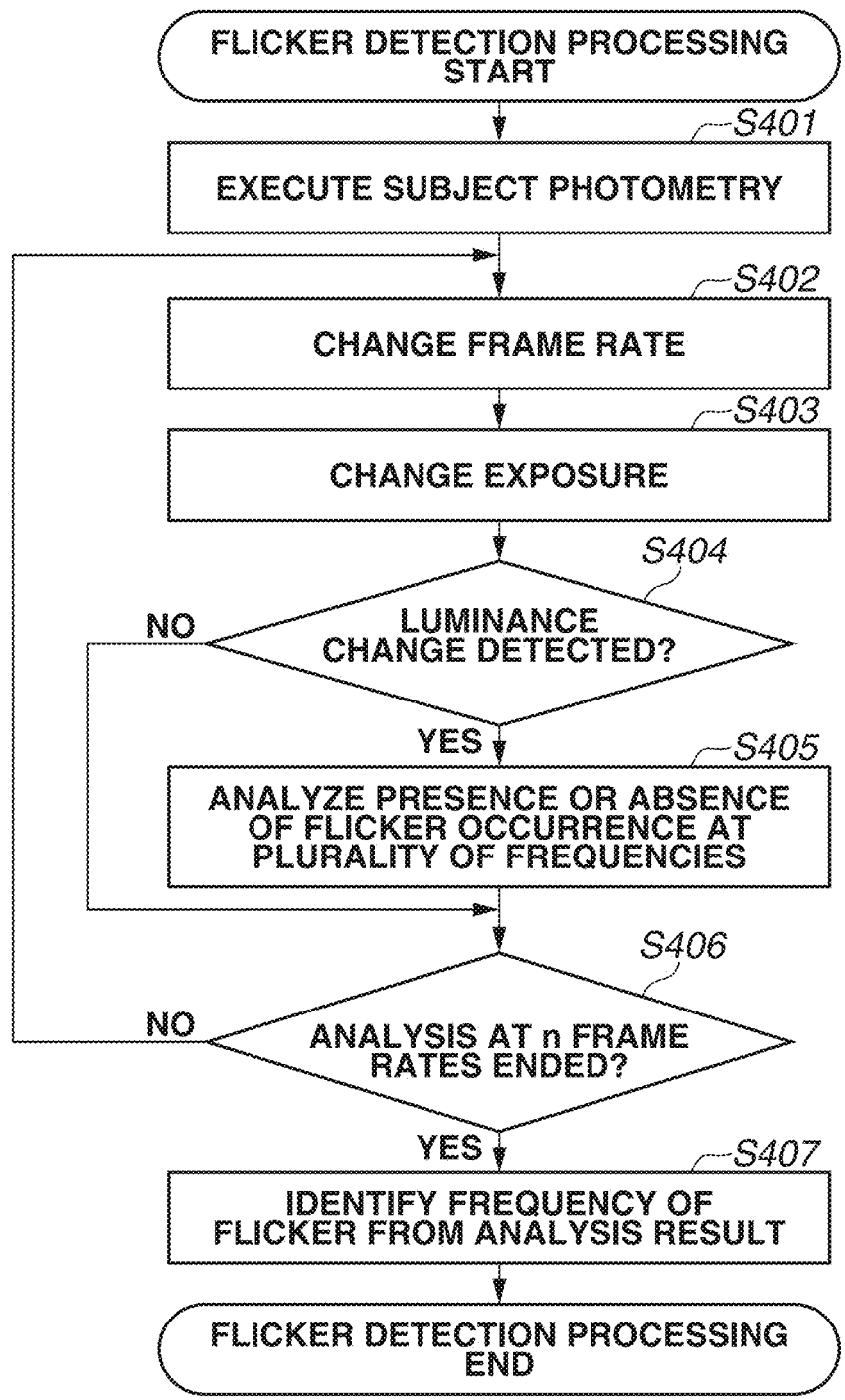

< EXAMPLE OF IMAGE CAPTURING CYCLE >

< EXAMPLE OF DETECTION TARGET FREQUENCY >

| IMAGE CAPTURING CYCLE | 159 fps | 100 fps | 126 fps |
|---|---|---|---|
| DETECTION TARGET FREQUENCY | (A) 50-63 Hz | (G) 63-79 Hz | (M) 79-100 Hz |
| | (B) 100-126 Hz | (H) 126-159 Hz | (N) 159-200 Hz |
| | (C) 200-252 Hz | (I) 252-318 Hz | (O) 318-400 Hz |
| | (D) 400-504 Hz | (J) 504-636 Hz | (P) 636-800 Hz |
| | (E) 800-1008 Hz | | |

< EXAMPLE OF IMAGE CAPTURING CYCLE >

< EXAMPLE OF DETECTION TARGET FREQUENCY >

| IMAGE CAPTURING CYCLE | 166 fps | 100 fps | 133 fps |
|---|---|---|---|
| DETECTION TARGET FREQUENCY | (A) 50-67 Hz | (G) 67-83 Hz | (M) 83-100 Hz |
| | (B) 100-133 Hz | (H) 133-167 Hz | (N) 167-200 Hz |
| | (C) 200-266 Hz | (I) 266-333 Hz | (O) 333-400 Hz |
| | (D) 400-522 Hz | (J) 522-667 Hz | (P) 667-800 Hz |
| | (E) 800-1067 Hz | | |

FIG.10

|  | Tv1 | Tv2 | ... | TvN |
|---|---|---|---|---|
| 100 fps | 1/100 | 1/200 | ... | 1/(100 × N) |
| 126 fps | 1/126 | 1/252 | ... | 1/(126 × N) |
| 159 fps | 1/159 | 1/318 | ... | 1/(159 × N) |

FIG.11

|         | Tv1   | Tv2   | ... | TvN         |
|---------|-------|-------|-----|-------------|
| 100 fps | 1/100 | 1/200 | ... | 1/(100 × N) |
| 133 fps | 1/133 | 1/266 | ... | 1/(133 × N) |
| 167 fps | 1/167 | 1/334 | ... | 1/(167 × N) |

ALL-LINE READOUT

1/2-THINNING READOUT

FIVE-POINT
SAMPLING
IN VERTICAL
DIRECTION

TEN-POINT
SAMPLING
IN VERTICAL
DIRECTION

FIVE-POINT
SAMPLING AT
IMAGE CENTER

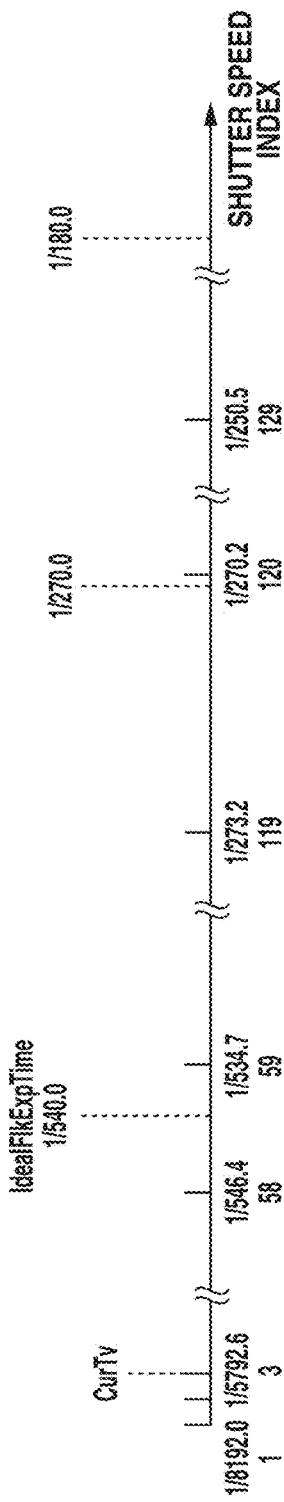
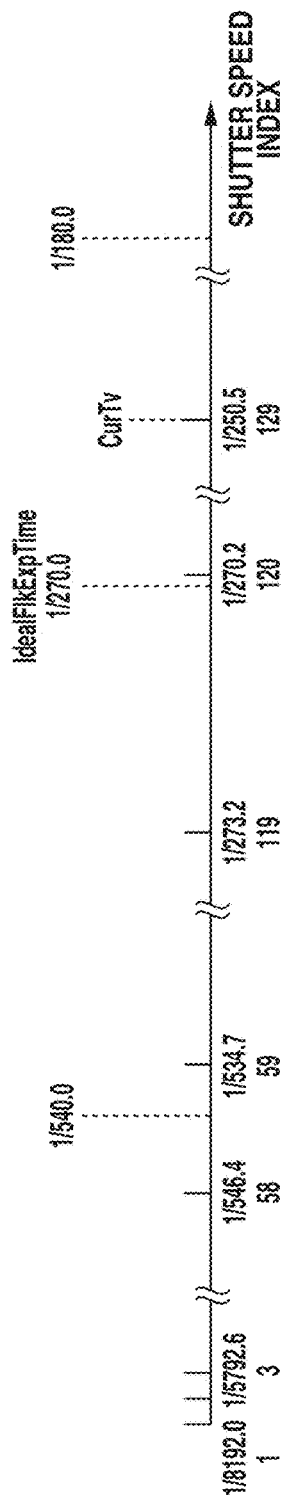

IN CASE WHERE FLICKER FREQUENCY IS 540.0 Hz

IN CASE WHERE NO FLICKER IS DETECTED

IN CASE WHERE FLICKER FREQUENCY IS 540.0 Hz

FIG.22A

1801 — FLICKER AT 540.0 Hz HAS BEEN DETECTED. SELECT SHUTTER SPEED.

1802 — CURRENT SHUTTER SPEED: 1/5792.6

1803 — CANDIDATE 1: 1/534.7
1804 — CANDIDATE 2: 1/546.4
1805 — LARGE REDUCTION EFFECT: 1/270.2

1801 — FLICKER AT 540.0 Hz HAS BEEN DETECTED. SELECT SHUTTER SPEED.

1802 — CURRENT SHUTTER SPEED: 1/250.5

1803 — CANDIDATE 1: 1/270.2
1804 — CANDIDATE 2: 1/273.2
1805 — LARGE REDUCTION EFFECT: 1/180.0

1806

IMAGING APPARATUS, FLICKER DETECTION METHOD, AND STORAGE MEDIUM

BACKGROUND

Technical Field

The aspect of the embodiments relates to an imaging apparatus, a flicker detection method, and a storage medium.

Description of the Related Art

Recent image sensors included in imaging apparatuses such as digital cameras and mobile phones have higher sensitivity. This development has achieved capturing a bright image with a reduced blurring of a subject at a higher shutter speed (short exposure time) even under relatively-dark environment such as indoor environment compared with daytime outdoor environment.

It is known that fluorescent lights commonly used as room light sources can cause flicker due to an effect of the commercial power frequency, resulting in a phenomenon of periodical changes in luminous flux of an illuminated subject. If a plurality images of a subject is captured at high shutter speed under a light source that causes flicker, an image (screen) can suffer uneven exposure or color, or some continuously captured images can suffer variations in exposure or color temperature between them.

Japanese Patent Application Laid-Open No. 2014-220763 discusses a technique of detecting flicker based on a plurality of images continuously acquired at a rate that represents the least common multiple of flicker frequencies (100 hertz (Hz) and 120 Hz) attributed to two commercial power frequencies of 50 Hz and 60 Hz.

On the other hand, more and more light emitting diodes (LED) as light sources have been recently used. A LED receives drive current controlled through a rectification circuit, whose current supply method is different from that for a fluorescent light. That produces changes in quantity of light at a cycle in a waveform, both of which differ from those of the commercial power frequencies. For this reason, flicker also occurs with an LED light source as with a fluorescent light source, but the frequency of changes in quantity of light is different from those with other light sources such as a fluorescent light.

Japanese Patent Application Laid-Open No. 2014-220763 discusses a detection method for flicker at the frequencies (100 Hz and 120 Hz) attributed to two commercial power frequencies of 50 Hz and 60 Hz under a light source such as a fluorescent light, but does not describe a countermeasures against flicker occurring under an LED light source.

It is difficult to preliminarily estimate the frequency of changes in quantity of light as flicker with a light source such as an LED, differently from that of flicker occurring due to a commercial power frequency. That makes it difficult for the user to preliminarily adjust the shutter speed (exposure time) manually to reduce the influence of flicker. Furthermore, if the currently-occurring flicker exceeds the detectable range of an imaging apparatus, the flicker may fail to be detected appropriately. In other words, the technique discussed in Japanese Patent Application Laid-Open No. 2014-220763 limits information that can be preliminarily learned by the user as information regarding flicker.

SUMMARY

According to an aspect of the embodiments, an apparatus includes a detection unit configured to detect a flicker frequency of a subject light source by sampling an output signal of a sensor in first sampling processing, a determination unit configured to determine whether the detected flicker frequency falls within a detection target range, by sampling an output signal of the sensor in second sampling processing, and a control unit configured to perform control to notify a user in response to determination by the determination unit that the detected flicker frequency falls out of a detection target range in the first sampling processing.

Further features of the disclosure will become apparent from the following description of exemplary embodiments with reference to the attached drawings.

BRIEF DESCRIPTION OF THE DRAWINGS

FIG. 2 illustrates a shutter speed setting (index) table according to an exemplary embodiment of the present invention.

FIG. 4 is a flowchart illustrating flicker detection processing according to the first exemplary embodiment of the present invention.

FIG. 10 illustrates setting values of exposure times (shutter speed) in a first pattern of a plurality of image capturing cycles for flicker detection according to the first exemplary embodiment of the present invention.

FIG. 11 illustrates setting values of exposure times (shutter speed) in a second pattern of a plurality of image capturing cycles for flicker detection according to the first exemplary embodiment of the present invention.

FIGS. 15A and 15B illustrate a setting method for an ideal flicker reduction exposure time that is used in a case where flicker changing at a predetermined frequency of quantity of light occurs according to an exemplary embodiment of the present invention.

FIGS. 22A and 22B each illustrate a notification image to be displayed on a display unit by display processing according to a second exemplary embodiment of the present invention.

DESCRIPTION OF THE EMBODIMENTS (Basic Configuration of Imaging Apparatus)

Figure 1:
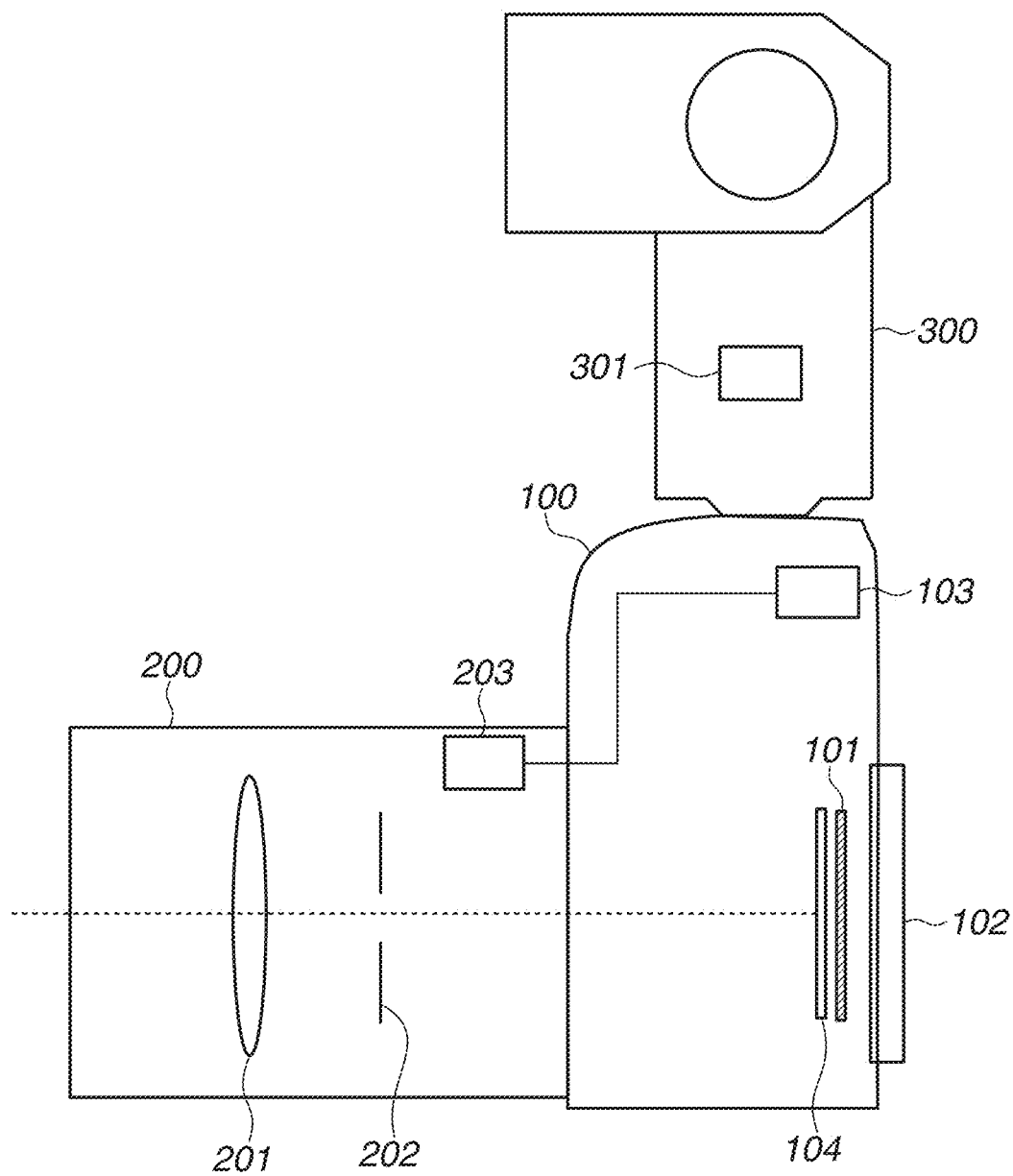
FIG. 1 is a block diagram illustrating configurations of a camera main body, a lens unit, and a light emission device, which serve as an imaging apparatus, according to an exemplary embodiment of the present invention.

Hereinafter, some exemplary embodiments of the present invention will be described with reference to the attached drawings. FIG. 1 is a block diagram illustrating configurations of a camera main body 100, a lens unit 200, and a light emission device 300, which serve as an imaging apparatus, according to a first exemplary embodiment of the present invention. One or more functional blocks illustrated in FIG. 1 may be implemented by hardware such as an application specific integrated circuit (ASIC) or a programmable logic array (PLA). Alternatively, one or more functional blocks may be implemented by a programmable processor (microprocessor, microcomputer) such as a central processing unit (CPU) or a micro processing unit (MPU) operating software. Yet alternatively, one or more functional blocks may be implemented by a combination of pieces of software and hardware.

In the following description, even when different functional blocks are described as operation subjects, the same pieces of hardware can be implemented as the corresponding subjects. In the present exemplary embodiment, an imaging apparatus will be described as an example, but the application is not limited to an imaging apparatus as long as a flicker detection method is performable, and a flicker detection device or a program may be used instead.

First of all, components included in the camera main body 100 will be described. The camera main body 100 includes a frame memory (not illustrated), and also functions as a storage unit that can temporarily store signals (video signals) and read out the signals as appropriate. Generally, a frame memory is called a random access memory (RAM). These days, a dual data rate 3-synchronous dynamic RAM (DDR3-SDRAM) is often used. This frame memory allows various types of processing.

An image sensor 101 is an imaging unit including a charge-accumulating solid-state image sensor such as a complementary metal-oxide semiconductor (CMOS) image sensor or a charge-coupled device (CCD) image sensor that can convert that received luminous flux of an illuminated subject that has been guided to the inside of the camera main body 100 via the lens unit 200 into an electrical image signal. Images (signals) obtained using the image sensor 101 by drive control performed by a CPU 103 to be described below are handled as various image signals such as captured images for live view display, flicker detection, or recording. Because the electrical signals obtained by the image sensor 101 are analog values, the image sensor 101 also has a function of converting analog values into digital values. Based on an image signal output from the image sensor 101, an evaluation value (photometric value) regarding the brightness of a subject can be detected. The exposure time of the image sensor 101 also is controllable in accordance with a shutter speed settable as an exposure control value related to the image sensor 101.

A mechanical shutter 104 is a light shielding unit movable in a direction parallel to the signal scanning direction of the image sensor 101. Adjusting an exposure aperture formed of a plurality of shutter blades included in the mechanical shutter 104 in accordance with the above-described shutter speed enables control of an exposure time of the image sensor 101. The exposure time control according to an exemplary embodiment of the present invention can be performed with the mechanical shutter 104 or a so-called electronic shutter through adjustments of a signal reset/readout timing of the image sensor 101, or using both.

A display unit 102 is a display device visible to the user. Via the display unit 102, the user can check an operating status of the camera main body 100. For example, the display unit 102 displays videos through image processing based on image signals of subjects, and setting menus. A liquid crystal display (LCD) or an organic electroluminescence (EL) may be used as the display unit 102. Display of an image acquired by the image sensor 101 and a setting condition such as an exposure control value on the display unit 102 in real time during the image capturing of a subject enables so-called live view display. The display unit 102 of the present exemplary embodiment includes a resistive or capacitive thin-film element called a touch panel, and also serves as an operation unit touch-operable by the user.

The CPU 103 is a control unit that can comprehensively control the camera main body 100 and accessory components attached to the camera main body 100. A read only memory (ROM) and a RAM are connected to the CPU 103. The ROM (not illustrated) is a nonvolatile recording device. Programs for operating the CPU 103 and various adjustment parameters are recorded on the ROM. Programs read out from the ROM are loaded onto a volatile RAM (not illustrated) and run. Typically, a low-speed, low-capacity device compared with a frame memory (not illustrated) is used as the RAM.

Next, details of the lens unit 200 will be described. The lens unit 200 is an accessory detachably attached to the camera main body 100, and is a so-called interchangeable lens including a lens group 201 such as a focusing lens, a zoom lens, and a shift lens. For example, a focusing lens included in the lens group 201 can make focus adjustment for a subject by adjusting a lens position in the optical axis direction of the lens.

A diaphragm 202 is a light quantity adjustment member for adjusting the quantity of luminous flux of an illuminated subject guided to the inside of the camera main body 100 via the lens unit 200. In the present exemplary embodiment, the adjustment of quantity of light is performable by adjusting an aperture diameter of the diaphragm 202 that means changing an aperture value as an exposure control value related to the aperture diameter of the diaphragm 202.

A lens positioning unit (LPU) 203 is a control unit that controls each component of the lens unit 200. For example, the LPU 203 can control the drive of the lens group 201 and the diaphragm 202. The LPU 203 is connected with the CPU 103 of the camera main body 100 via terminals (not illustrated), and can drive each component of the lens unit 200 in accordance with control instructions from the CPU 103.

Next, details of the light emission device 300 will be described. The light emission device 300 is an external light emission device detachably attached via a connection portion (not illustrated) provided in the camera main body 100. A system processing unit (SPU) 301 is a control unit that controls each component of the light emission device 300. The SPU 301 can mainly control light emission and communication with the camera main body 100. The SPU 301 is connected with the CPU 103 of the camera main body 100 via contact points (not illustrated), and can drive each component of the light emission device 300 in accordance with control instructions from the CPU 103.

The above components of the imaging apparatus according to the first exemplary embodiment of the present invention have been described, but the present invention is not limited to the above-described configuration. For example, the camera main body 100 may have a configuration incorporating each device equivalent to the lens unit 200 or the light emission device 300.

(Setting Method for Shutter Speed)

Next, a setting method for a shutter speed as an exposure control value for controlling an exposure time of the image sensor 101 according to the present exemplary embodiment will be specifically described with reference to FIG. 2. FIG. 2 illustrates a shutter speed setting (index) table according to the present exemplary embodiment of the present invention.

It has been generally known that the shutter speed is changeable in increments of ½ or ⅓ exposure value (EV) of quantity of light. In the present exemplary embodiment, to respond to flicker that is periodically flickering at various frequencies of a light-emitting diode (LED) light source, the shutter speed is adjustable in finer increments. Specifically, in the present exemplary embodiment, if the shutter speed falls within the range from 1/8192.0 to 1/4871.0, the shutter speed is adjustable in increments of ¼ EV, and if the shutter speed falls within the range from 1/4096.0 to 1/2233.4, the shutter speed is adjustable in increments of ⅛ EV. In addition, if the shutter speed falls within the range from 1/2048.0 to 1/1069.3, the shutter speed is settable in increments of 1/16 EV, and if the shutter speed falls within the range from 1/1024.0 to 1/523.2, the shutter speed is adjustable in increments of 1/32 EV. Furthermore, if the shutter speed falls within the range from 1/512.0 to 1/258.8, the shutter speed is adjustable in increments of 1/64 EV, if the shutter speed falls within the range from 1/256.0 to 1/128.7, the shutter speed is adjustable in increments of 1/128 EV, and if the shutter speed falls within the range from 1/128.0 to 1/50.0, the shutter speed is adjustable in increments of 1/256 EV.

In the table illustrated in FIG. 2, the descriptions of some shutter speeds are omitted for visibility. In addition, the numerical value of an index in the table illustrated in FIG. 2 is used in shutter speed selection processing for reducing flicker, which will be described below.

In the camera main body 100 according to the present exemplary embodiment, an electronic shutter is used to make the shutter speed freely-settable from a high shutter speed shorter than 1/8000 seconds as described above, to a lower shutter speed (not illustrated) longer than 1/50 seconds. The setting of a shutter system (independent use of an electronic shutter or the mechanical shutter 104, or use of both an electronic shutter and the mechanical shutter 104) can be changed at any time by a manual operation performed by the user via a menu screen displayed on the display unit 102 by way of example.

(Flicker Reduction Processing)

Figure 3:
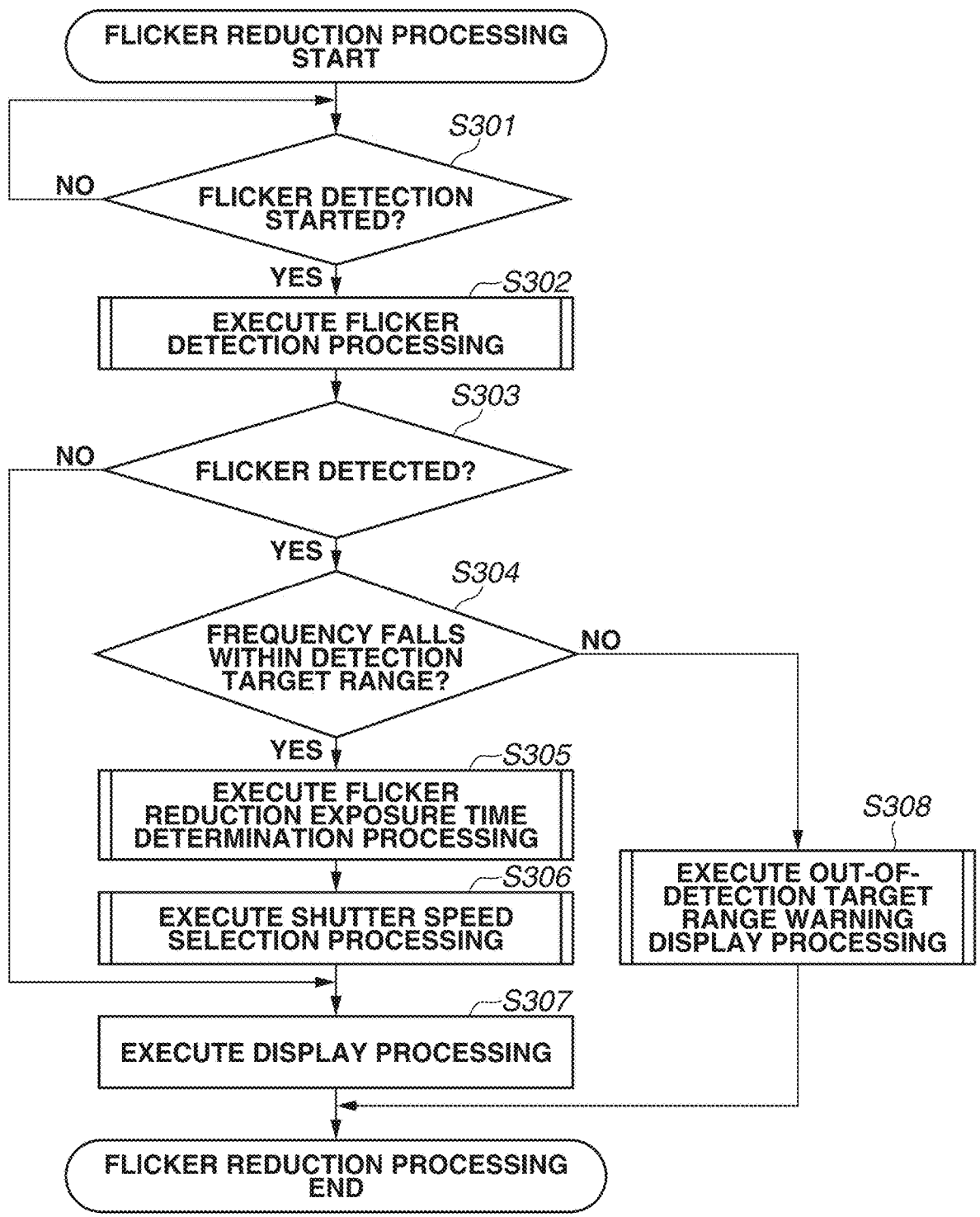
FIG. 3 is a flowchart illustrating flicker reduction processing according to a first exemplary embodiment of the present invention.

Next, flicker reduction processing according to the present exemplary embodiment will be described with reference to a flowchart illustrated in FIG. 3. FIG. 3 is a flowchart illustrating flicker reduction processing according to the first exemplary embodiment of the present invention.

First of all, the flicker reduction processing is started based on a predetermined operation such as a manual operation of the user performed based on a menu displayed on the display unit 102. The flicker reduction processing according to the present exemplary embodiment is processing for performing control in such a manner as to prevent unevenness attributed to flicker from being generated in a moving image such as live view display by setting a shutter speed (i.e., exposure time) to reduce the influence of detected flicker. The flicker reduction processing according to the present exemplary embodiment of the present invention is not limited to this. For example, as a flicker reduction method, a gain for reducing unevenness may be applied to an image instead of adjusting a shutter speed.

After the flicker reduction processing is started, first of all, in step S301, the CPU 103 repeats the processing in step S301 until flicker detection processing is started. If it is determined in step S301 that the detection has been started (YES in step S301), the processing proceeds to step S302. In step S302, the CPU 103 performs flicker detection processing. The details of the flicker detection processing will be described below.

Next, in step S303, the CPU 103 determines whether flicker occurs based on the processing result obtained in step S302. If it is determined in step S303 that flicker has been detected (YES in step S303), the processing proceeds to step S304. Otherwise (NO in step S303), the processing proceeds to step S307. When flicker at a predetermined level or more has occurred, it is determined as the detection result of flicker that flicker has been detected. A calculation method for a level of flicker will be described below.

In step S304, the CPU 103 determines whether the flickering cycle of the detected flicker is the frequency of changes in quantity of light as flicker falling within a detection target range. If it is determined that the frequency of changes in quantity of light as flicker falls within a detection target range (YES in step S304), the processing proceeds to step S305. Otherwise (out of the detection target range) (NO in step S304), the processing proceeds to step S308. The details of a method of determining whether the frequency of changes in quantity of light as flicker falls within a detection target frequency range will be described below.

In step S305, the CPU 103 determines an exposure time (shutter speed) to reduce the influence of the flicker detected earlier (flicker reduction exposure time determination processing). The details of the flicker reduction exposure time determination processing will be described below.

Next, in step S306, based on information regarding the exposure time suitable for flicker reduction that has been determined in step S305, the CPU 103 performs shutter speed selection processing for selecting a shutter speed that can reduce the influence of the flicker. The details of the shutter speed selection processing will be described below.

In step S307, the CPU 103 performs display processing of displaying the flicker detection result (detected/undetected), and values selectable as a shutter speed that can reduce the influence of the flicker as processing results obtained in the processing in steps S305 and S306. The details of the display processing will be described below.

In step S308, based on the detection result obtained in step S302, the CPU 103 notifies the user that the frequency of changes in quantity of light of the currently-occurring flicker falls out of the frequency range guaranteed by the camera main body 100 as a detection target. The details of the notification will be described below. The above-described flicker reduction processing allows the acquirement of an image with reduced influence of flicker irrespective of the flicker frequency, and image display and recording that are based on the image.

(Flicker Detection Processing)

Next, the flicker detection processing according to the present exemplary embodiment will be described with reference to FIG. 4. As described above, in an LED light source, drive current is controlled through a rectification circuit unlike a light source such as a fluorescent light. Thus, changes in quantity of light (flickering) (i.e., flicker) occur at a cycle different from that of the power frequency in driving the light source. For this reason, in detecting flicker attributed to a light source such as an LED, a frequency as a detection target is not limited to a specific numerical value, unlike cases of drive power frequencies. That calls for analysis of whether flicker occurs with respect to a broad frequency range.

On the other hand, if the frequency of changes in quantity of light as flicker (light source flickering cycle) is identical to or an integer multiple of an image capturing cycle in continuously capturing images of a subject (hereinafter, this state will be referred to as a synchronized state), that reduces changes in quantity of light (flickering) between the continuously-obtained images. In this case, for example, image quality degradation such as unevenness attributed to flicker does not occur in live view display of continuously displaying images, but exposure unevenness attributed to flicker may occur in a still image acquired by performing image capturing at a shutter speed. Even if an image capturing frame rate for a live view display image is identical to the frequency of changes in quantity of light as flicker in acquiring a moving image for recording at a different frame rate, that moving image could suffer exposure unevenness or a luminance variation attributed to flicker.

There is known a method of detecting and comparing the difference in quantity of light (contrasting) between images obtained in continuous image capturing as a method of identifying the frequency of changes in quantity of light as flicker. If the frequency of changes in quantity of light as flicker is identified using this method, adjustment will be made so that the frequency of changes in quantity of light as flicker is out of synchronization with an image capturing cycle (frame rate).

In the present exemplary embodiment, a method is used of analyzing the frequency of changes in quantity of light as flicker using a plurality of image capturing cycles to determine whether flicker occurs. In this method, analysis of the frequency of changes in quantity of light as flicker using a plurality of frequencies allows the avoidance of synchronization between the frequency of changes in quantity of light as flicker and all of the image capturing cycles, enabling effective detection processing on flicker in a broad frequency range.

FIG. 4 is a flowchart illustrating flicker detection processing according to the first exemplary embodiment of the present invention. As illustrated in FIG. 4, in step S401, the CPU 103 performs photometry calculation on a subject (subject photometry) to determine exposure related to the flicker detection processing in subject image capturing. Any method may be employed as a photometry calculation method. For example, in the present exemplary embodiment, an evaluation value is acquired based on the average value of image signals obtained by performing charge accumulation for photometry calculation using the image sensor 101. Then, the CPU 103 obtains a representative luminance (photometric value) of the subject as the photometry result based on the acquired evaluation value. A photometric value (representative luminance) is calculated by dividing the angle of field corresponding to an image signal, into a plurality of blocks, obtaining the average value of signals output from the pixels in each block, and adding and averaging the average values obtained from the individual blocks. As a unit of a photometric value, 1 BV in a so-called additive system of photographic exposure (APEX) system corresponds to 1 EV of a luminance value, but another unit may be used.

Next, in step S402, the CPU 103 adjusts the image capturing cycle to an image capturing cycle (frame rate) for flicker detection. The details of an adjustment method for an image capturing cycle for flicker detection will be described below.

Next, in step S403, the CPU 103 determines an exposure control value (changes exposure) based on the photometric value obtained earlier. The exposure control value according to the present exemplary embodiment includes a shutter speed (i.e., accumulation time), an aperture value, and an image capturing sensitivity (ISO sensitivity), and is a parameter that can adjust the brightness of an obtained captured image of a subject. The determined exposure control value is stored into the above-described RAM, and the exposure of the camera main body 100 is changed, and the acquisition of an image for flicker detection is started.

Next, in step S404, the CPU 103 determines whether a luminance change has occurred in the acquired images (i.e., whether flicker has occurred). As flicker cannot be correctly detected if a light source flickering cycle as described above is in synchronization with an image capturing cycle of a subject, whether a luminance change occurs is determined based on the acquired images. If it is determined that a luminance change has not occurred in the acquired images (NO in step S404), a detection operation at the current frame rate (image capturing cycle) is skipped on the assumption that the image capturing cycle is in synchronization with the frequency of changes in quantity of light as flicker related to the subject or flicker has not occurred.

If it is determined that a luminance change has been detected in the acquired images (YES in step S404), the processing proceeds to step S405. In step S405, the CPU 103 analyzes (detects) whether flicker occurs at a plurality of different frequencies. The details of a flicker detection method at a plurality of frequencies in step S405 will be described below.

Next, in step S406, the CPU 103 determines whether detection using a predetermined number (n) of image capturing cycles has been completed. If it is determined that detection the predetermined number of image capturing cycles has not been completed (NO in step S406), the processing returns to step S402, in which the image capturing cycle (frame rate) is changed, and the processing in step S403 and subsequent steps is repeated.

If it is determined that detection the predetermined number of image capturing cycles has been completed (YES in step S406), the processing proceeds to step S407. In step S407, the CPU 103 identifies the frequency of flicker on the subject based on the detection result obtained up to step S405. In the processing in step S407, whether flicker occurs at a plurality of different frequencies has already been determined using a plurality of image capturing cycles (frame rates).

Through comparison between the levels of flicker detected at the respective frequencies, the flicker at a frequency at which the level is largest is identified as the currently-occurring flicker on the subject as the final detection result. In the present exemplary embodiment, the magnitude of changes in quantity of light (magnitude of amplitudes of curves indicating regular changes that indicate changes in quantity of light) are compared, but a comparison method is not limited to this. For example, a configuration may be employed of comparing stability degrees of changes in quantity of light, instead of comparing levels of flickers.

The above-described image capturing cycle (frame rate) for flicker detection will be specifically described. As described above, the camera main body 100 according to the present exemplary embodiment performs flicker detection processing using a plurality of image capturing cycles. For example, a case will be described of detecting the frequency of changes in quantity of light as flicker while switching an image capturing cycle between 100 frames per second (fps) and 120 fps. In this case, flicker changing in quantity of light at k cycles (k is a natural number)×100, such as 100 hertz (Hz), 200 Hz, or 300 Hz, which is an integer multiple of an image capturing cycle of 100 fps, is in synchronization with an image capturing cycle, which prevents a correct detection of the flicker. On the other hand, in a case of detecting the frequency of changes in quantity of light as flicker using an image capturing cycle of 120 fps, flicker changing in quantity of light at a cycle of m (m is a natural number)×120 Hz, such as 120 Hz, 240 Hz, or 360 Hz, which is an integer multiple of an image capturing cycle of 120 fps, is in synchronization with an image capturing cycle, which also prevents a correct detection of the flicker. In addition, 600 Hz and 1200 Hz, which are frequencies satisfying both conditions of k×100 Hz (k is a natural number) and m×120 Hz (m is a natural number), are least common multiples of 100 Hz and 120 Hz. If flicker changing in quantity of light at such a frequency has occurred, the frequency of changes in quantity of light as the flicker is in synchronization with both of image capturing cycles of 100 fps and 120 fps, which prevents correct detection of the flicker whichever image capturing cycle is selected as an image capturing cycle of an obtained image to be used.

For example, with a light source such as an LED light source that includes a rectification circuit, an adjusted power frequency typically falls within the range from 50 Hz to 1000 Hz. Thus, also if flicker changing in quantity of light at a frequency of 600 Hz as above-described occurs, the flicker can occur from an LED light source, but the flicker sometimes fails to be correctly detected depending on the image capturing cycle. More specifically, even if flicker detection is performed using images acquired at two image capturing cycles from among flickers in a broad frequency range that are assumed to occur with an LED light source, flicker at an undetectable frequency also exists.

In the above-described example, flicker changing at a frequency exactly matching an integer multiple of an image capturing cycle (frame rate) has been described, but even if the frequency does not exactly match an integer multiple of the image capturing cycle, the detection accuracy for flicker can decline. For example, flicker changing at a frequency close to an integer multiple number of the image capturing cycle used when images for flicker detection are acquired has a small influence of uneven exposure on images, and in some cases, it takes a long time to detect the flicker, or in other cases, the flicker fails to be correctly detected.

In view of the foregoing, in the present exemplary embodiment, to effectively detect flicker in a broad frequency range that can occur with an LED light source, the number n, or the number of a plurality of image capturing cycles (frame rate) used in flicker detection is adjusted in such a manner as to satisfy the condition of "n>3 (n is a natural number)". In other words, flicker detection is performed using n image capturing cycles or more, where n is a natural number of 3 or more.

The increase of the number n of image capturing cycles used in detection as the frequency of changes in quantity of light as flicker to be detected becomes higher allows accurate detection of the frequency of changes in quantity of light as the flicker. Nevertheless, in some cases, increasing the number of image capturing cycles used in flicker detection results in a longer period taken to detect flicker. Taking that into account, release time lag and decline in display frame rate of live view image are points to be considered. For this reason, in the present exemplary embodiment, the number of image capturing cycles used in flicker detection is set as n=3 as the number of samplings to effectively detect flicker likely to occur with a light source such as an LED light source that is assumed to be generally used in many cases.

Next, a selection method for a specific numerical value in each of n image capturing cycles will be described.

In the present exemplary embodiment, first of all, a reference image capturing cycle is set. For example, 100 fps is assumed as the reference image capturing cycle. The frequency of changes in quantity of light as flicker to be synchronized with an image capturing cycle of 100 fps is an integer multiple of 100 Hz, and if flicker at the frequency of changes in quantity of light occurs, such flicker cannot be correctly detected.

Also in a case of performing sampling at an image capturing cycle of 200 fps, which is double a reference image capturing cycle of 100 fps, the situation is similar to that in the sampling at a reference image capturing cycle of 100 fps occurs. More specifically, if an integer multiple of an image capturing cycle for obtaining images for flicker detection is identical to an integer multiple of the frequency of changes in quantity of light as flicker, an image capturing cycle and the frequency of changes in quantity of light as flicker are synchronized with each other, and the flicker cannot be correctly detected based on images acquired for sampling.

In view of the foregoing, in the present exemplary embodiment, the remaining (n−1) (2 in the present exemplary embodiment) image capturing cycles are set between a reference image capturing cycle and an image capturing cycle that is an integer multiple of the reference image capturing cycle next as n (n=3 in the present exemplary embodiment) image capturing cycles. For example, if flicker is to be detected using three image capturing cycles with a reference image capturing cycle of 100 fps, remaining image capturing cycles are set between 100 fps and 200 fps as a plurality of image capturing cycles for detecting flicker aside from 100 fps. In the present exemplary embodiment, each image capturing cycle (frequency) is set in such a manner that the least common multiple of n image capturing cycles becomes equal to or larger than a predetermined frequency. For example, because the flickering frequency of an LED light source is typically 10000 Hz or less, the frequency of each image capturing cycle is determined in such a manner that the least common multiple of n image capturing cycles (frame rates) becomes equal to or larger than 10000 as the predetermined frequency. To reduce the influence of flicker in the camera main body 100, each image capturing cycle (frequency) is set in such a manner that the least common multiple of n image capturing cycles becomes larger than the inverse number of the upper limit value in the higher speed range of shutter speeds settable by the camera main body 100. This configuration allows reduction of the influence of flicker detected by the adjustment of the shutter speed, together with effective detection of flicker with a light source such as an LED light source that changes in quantity of light at a high frequency.

Figures 5A, 5B:
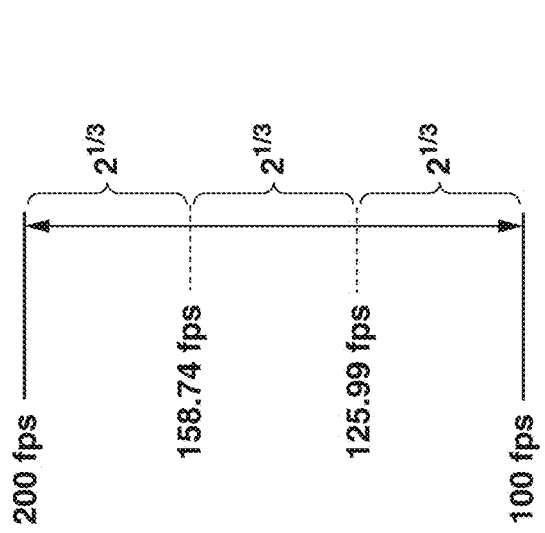
FIGS. 5A and 5B illustrate a selection method for a plurality of image capturing cycles that is used to detect flicker according to the first exemplary embodiment of the present invention.

FIGS. 5A and 5B are diagrams illustrating a selection method for a plurality of image capturing cycles to be used in detecting flicker according to the first exemplary embodiment of the present invention. To accurately detect the frequency of changes in quantity of light as flicker, image capturing cycles are separated as far as possible. This establishes the difference between any of a plurality of image capturing cycles and the frequency of changes in quantity of light as flicker (light source flickering cycle) to be detected to such a degree that the flicker can be correctly detected. Thus, in the present exemplary embodiment, as illustrated in FIG. 5A, to divide the range (100 fps to 200 fps) of detection target image capturing cycles at predetermined intervals, image capturing cycles separated by 1/3 power of 2 are set to detect flicker using the image capturing cycles.

Specifically, in the present exemplary embodiment, three image capturing cycles are set to a reference image capturing cycle of 100 fps, 100 fps×2^(1/3)=125.99 fps 126 fps, and 100 fps×2^(2/3)=158.74 fps≈159 fps as illustrated in FIG. 5A. The image capturing cycles are different by about 2^(1/3)=1.2599≈1.26 times, or about 26%. With this configuration, each range does not greatly deviate from a detection target frequency in flicker detection in a broad frequency range from 50 to 1000 Hz or more divided into a plurality of ranges. One of the image capturing cycles can keep a sufficient difference from the frequency of changes in quantity of light as flicker to be detected. Thus, in flicker detection at each of the set n image capturing cycles, a setting made of image capturing cycles at intervals of (1/n) power of 2 prevents decline in detection accuracy for each detection target frequency.

FIG. 5B illustrates a correspondence relationship between n image capturing cycles and the frequencies of changes in quantity of light as flickers as detection targets. In the present exemplary embodiment, flicker is detected based on images obtained using an image capturing cycle of the frequency farthest from the frequency of changes in quantity of light as the flicker as a detection target of the n image capturing cycles. Specifically, in the present exemplary embodiment, as illustrated in FIG. 5B, flicker detection is performed based on a data table in which the frequencies of changes in quantity of light as flickers ranging from 50 Hz to 1008 Hz are divided into ranges (A) to (P) with respect to the three image capturing cycles illustrated in FIG. 5A.

In the present exemplary embodiment, by capturing an image of a subject at a shutter speed that represents the inverse number of the frequency of changes in quantity of light as flicker, an image capturing cycle synchronized with the frequency of changes in quantity of light as flicker is set to reduce the influence of the flicker. Thus, if a deviation is generated between an ideal shutter speed synchronized with the frequency of changes in quantity of light as flicker, and an actual shutter speed, the flicker has greater influence (uneven exposure, etc.) on images captured at low shutter speed than on those at a high shutter speed. For example, comparing between a shutter speed of 1/101 seconds deviated by 1 Hz from an ideal shutter speed for reducing the influence of flicker with a frequency of changes in quantity of light of 100 Hz and a shutter speed of 1/1001 seconds deviated by 1 Hz from an ideal shutter speed for reducing the influence of flicker with a frequency of changes in quantity of light of 1000 Hz, a deviation of 1 Hz exists between a shutter speed that can reduce the influence of flicker and an actual shutter speed. However, while one case of a shutter speed of 1/100 seconds has a deviation of 1%, the other case of a shutter speed of 1/1000 seconds has a deviation of 0.1%. In other words, with changes of shutter speeds for 1 Hz of the same deviation, flicker will have smaller influence on images captured at a higher shutter speed than on those captured at a lower shutter speed. On the other hand, images captured at much lower shutter speeds are more likely to be stable in fluctuation in quantity of light because image capturing fluctuations in quantity of light caused by flicker takes a longer time. For this reason, to detect flicker with the frequency of changes in quantity of light that can be reduced at a shutter speed equal to or lower than a predetermined value (e.g., shutter speed equal to or lower than 1/25 seconds), the detection range in a low-frequency region of flicker may be adjusted to be broader as appropriate.

In view of the foregoing, as illustrated in FIG. 5 in the present exemplary embodiment, the range of frequencies of changes in quantity of light as flickers as detection targets is divided into a plurality of ranges, and detection target ranges are set in such a manner that the frequencies of these consecutive ranges are different by 2^(1/3)=1.26 times. For example, while the range (N) illustrated in FIG. 5B targets flickers with frequencies of changes in quantity of light from 159 to 200 Hz to detect, the next range (C) targets flickers with frequencies of changes in quantity of light from 200 to 252 Hz to detect, which are about 1.26 times of those in the range (N).

As illustrated in FIG. 5B, the frequencies of an upper detection target range targeted by any image capturing cycle are about double the frequencies of the one lower detection target range. For example, the detection target frequencies of the ranges (A), (B), and (C) illustrated in FIG. 5B, which correspond to an image capturing cycle of 159 fps, are the ranges from 50 Hz to 63 Hz, from 100 Hz to 126 Hz, and from 200 Hz to 252 Hz, respectively. This is because these ranges are set considering that changes in quantity of light caused by flickers are identical to integer multiples of the frequencies. The above-described configuration in the imaging apparatus according to the present exemplary embodiment allows detection of flickers in a broad frequency range with stable accuracy.

In the present exemplary embodiment, as differences between image capturing cycles to be used in detection of flicker, the image capturing cycles are different by (1/n) power of m (m and n are natural numbers), and m=2 is set in the above description, but a setting method is not limited to this. For example, image capturing cycles may be set assuming that m=3 is set. In this case, because the differences between image capturing cycles becomes larger, detection accuracy for the frequency of changes in quantity of light as flicker as a detection target may decline as compared with the case where m=2 is set. However, when the same frequency ranges are used as detection target ranges, the time taken to detect flicker with m=3 is shorter than that with m=2, which means that detection with m=3 is more suitable in a broader range of frequencies of changes in quantity of light as flickers as a detection target range.

Figures 6A, 6B:
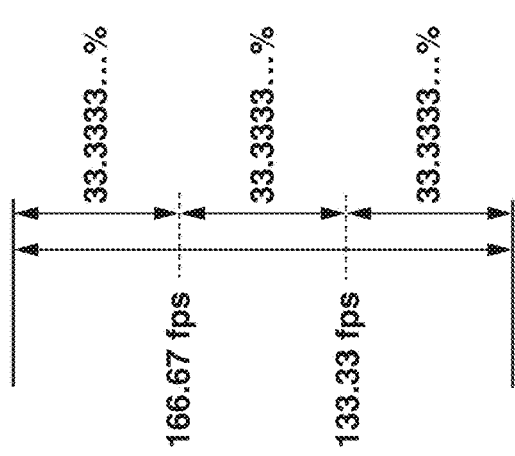
FIGS. 6A and 6B illustrate a modified example for a selection method for a plurality of image capturing cycles that is used to detect flicker according to the first exemplary embodiment of the present invention.

A selection method for n image capturing cycles (modified example) that is different from the above-described method will be described with reference to FIGS. 6A and 6B. FIGS. 6A and 6B illustrate a modified example of a selection method for a plurality of image capturing cycles to be used in detection of flicker according to the first exemplary embodiment of the present invention. A difference between this modified example and the above-described example described with reference to FIGS. 5A and 5B lies in a setting method for n image capturing cycles with respect to the detection target range of an image capturing cycle.

In this modified example, as illustrated in FIG. 6A, by equally dividing the detection target range of an image capturing cycle, a plurality of image capturing cycles is set. More specifically, the range (100 fps to 200 fps) of an image capturing cycle for flicker detection is regarded as a range of 100%, and n image capturing cycles are set differently by 33% and 66% from a reference image capturing cycle of 100 fps. Specifically, three image capturing cycles are set to a reference image capturing cycle of 100 fps, 100 fps× 1.333=133.333 . . . fps 133 fps, and 100 fps×1.666=166.666 fps 167 fps.

The differences between the above-described three image capturing cycles are 133.333/100=1.33333, 166.666/ 133.33=1.25, and 200/166.666=1.2, and the image capturing cycles are separated by 20% or more.

FIG. 6B illustrates a correspondence relationship between the n image capturing cycles illustrated in FIG. 6A, and the frequencies of changes in quantity of light as flickers as detection targets. As illustrated in FIG. 6B, also in this modified example, similarly to the above-described data table illustrated in FIG. 5B, flicker is detected based on images obtained using an image capturing cycle at the frequency farthest from the frequency of changes in quantity of light as flicker as a detection target from among the n image capturing cycles.

Differences between a plurality of image capturing cycles for flicker detection will be described. As described above, as the number of a plurality of image capturing cycles for flicker detection increases, the differences between image capturing cycles becomes smaller, but the time taken to perform sampling increases. Thus, in one embodiment, to accurately detect flicker in a short period of time, differences between image capturing cycles are made as large as possible and make the number of image capturing cycles for sampling as small as possible within a detectable broad range of frequencies of changes in quantity of light as flickers.

As described with reference to FIGS. 5A and 5B, a case where the range from a reference image capturing cycle to the double cycle of the reference image capturing cycle is regarded as 100%, and the range is divided in intervals of 1/n power of 2 will be described. In this case, a plurality of image capturing cycles for flicker detection differs at intervals represented by the following formula (1):

$$\{2^{(1/n)}-1\} \times 100[\%] \tag{1}$$

A case where the range from a reference image capturing cycle to the double cycle of the reference image capturing cycle is regarded as 100%, and the range is divided at intervals of 100/n[%] as described with reference to FIGS. 6A and 6B will be considered.

As calculated with n=3 set, the difference between an image capturing cycle separated from the reference image capturing cycle by 100%×(n−1)/n, and the double image capturing cycle of the reference image capturing cycle is the smallest, and the difference is obtained as represented by the following formula (2):

$$[200/\{100+\{(100\times(n-1)/n\}-1]\times100[\%]=\{200n/ (200n-100)-1\}[\%]=\{2n/(2n-1)-1\}\times100[\%]=\{1/ (2n-1)\}\times100[\%] \tag{2}$$

In other words, if the image capturing cycles are varied by 100/n[%], a plurality of image capturing cycles (frame rates) to be used for flicker detection is different from one another at a ratio of at least [{2n/(2n−1)−1}]×100% or more. In the camera main body 100 according to the first exemplary embodiment of the present invention, a plurality of image capturing cycles (frame rates) to be used for flicker detection is different from one another by a difference of at least [{2n/(2n−1)}−1]×100% or more. This includes the above-described case where the range from a reference image capturing cycle to the double cycle of the reference image capturing cycle is regarded as 100%, and the range is divided at intervals of 1/n power of 2.

Figure 7:
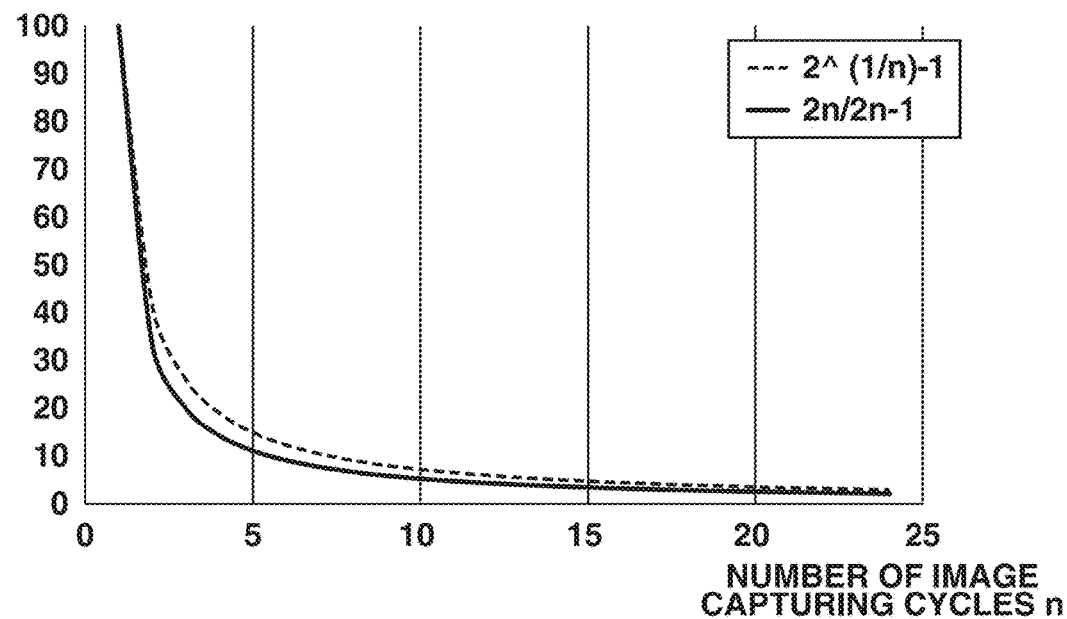
FIG. 7 is a diagram (graph) illustrating a relationship between determination methods for image capturing cycles for flicker detection and differences in the number of image capturing cycles according to the present exemplary embodiment.

A graph indicating a relationship between determination methods for image capturing cycles and differences in the number of image capturing cycles based on Formulae 1 and 2 described above is illustrated in FIG. 7. FIG. 7 is a diagram (graph) illustrating a relationship between determination methods for image capturing cycles for flicker detection and differences in the number of image capturing cycles according to the present exemplary embodiment. As illustrated in FIG. 7, in Formula 2 indicated by the solid line in FIG. 7, differences between image capturing cycles with respect to differences in the number n of image capturing cycles are smaller than those in Formula 1 indicated by the broken line. This condition is similarly applied to a further greater number n of image capturing cycles that is not illustrated in FIG. 7. In other words, two different determination methods for image capturing cycles have been described in the above-described example, and it can be seen that differences equal to or greater than values obtained using Formula 2 are held as differences between image capturing cycles in both of the methods.

The two examples have been described above as image capturing cycles for flicker detection, but image capturing cycles for flicker detection are not limited to these. As long as the imaging apparatus according to the present exemplary embodiment of the present invention can accurately detect flicker, n image capturing cycles (frame rates) (n is a natural number equal to or greater than three) different from one another can be set in such a manner that the least common multiple of the n image capturing cycles includes none of the n image capturing cycles. For example, even if 50 Hz, 150 Hz, and 300 Hz are set as image capturing cycles for flicker detection, no luminance changes in images obtained in each image capturing cycle occur in the same period, which prevents flicker from being correctly detected. For the imaging apparatus of the present exemplary embodiment, image capturing cycles for flicker detection are set to high rates equal to or greater than 100 fps, and the least common multiple of the image capturing cycles is adjusted not to be equal to or smaller than 10000 Hz, which may be employed as the frequency of a flickering light source such as an LED.

Next, the details of processing of analyzing (detecting) whether flicker occurs in a plurality of different frequencies in step S405 described above will be described. In the imaging apparatus according to the present exemplary embodiment, the frequency of changes in quantity of light as flicker is detected by extracting luminance changes with time based on luminance values of continuously acquired images, and analyzing the periodicity of luminance changes. Luminance changes generated in images differ depending on an acquisition method for images to be used for detection. For example, luminance changes in images differ between a case where images of a subject are captured using a so-called global shutter system such as a CCD image sensor and a case using a so-called rolling shutter system such as a CMOS image sensor. Hereinafter, how luminance changes in images acquired using each of the above-described methods will be described.

Figure 8:
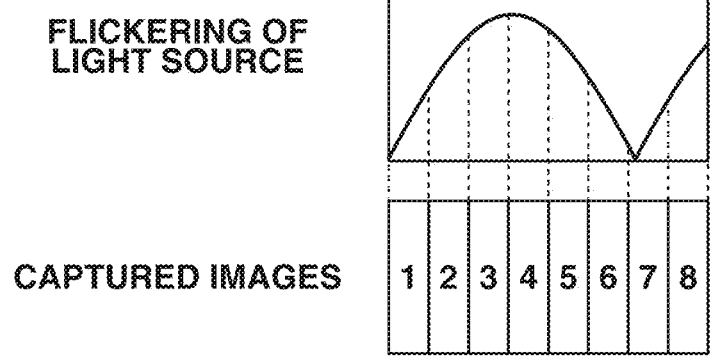
FIG. 8 is a diagram illustrating a luminance change, based on images continuously obtained using a global shutter system.

First of all, luminance changes in images obtained using a global shutter system will be described with reference to FIG. 8. FIG. 8 is a diagram illustrating luminance change based on images continuously obtained using a global shutter system. If images of a subject under a flickering light source are captured, captured images are affected by variations in flickering of the light source. Making measurements of luminance values on the whole surfaces of the captured images allows photometric values affected by variations in flickering of the light source to be obtained.

The luminance in this description may be a luminance signal calculated by multiplying R/G1/G2/B signals on a RAW image in a Bayer arrangement by fixed coefficients, or may be a color signal of R/G1/G2/B signals itself. Alternatively, the luminance may be a color signal or a luminance signal obtained from a sensor arrangement other than the Bayer arrangement.

Then, from the captured images obtained using the above-described method, the difference or the ratio in luminance (photometric value) between a plurality of consecutive images is calculated. Alternatively, an average image of a plurality of images is set as a reference image, and the difference or the ratio in luminance between each image and the reference image is calculated. Plotting luminance changes between images obtained by such a method allows detection of the transition of luminance change in images as illustrated in FIG. 8.

Figure 9:
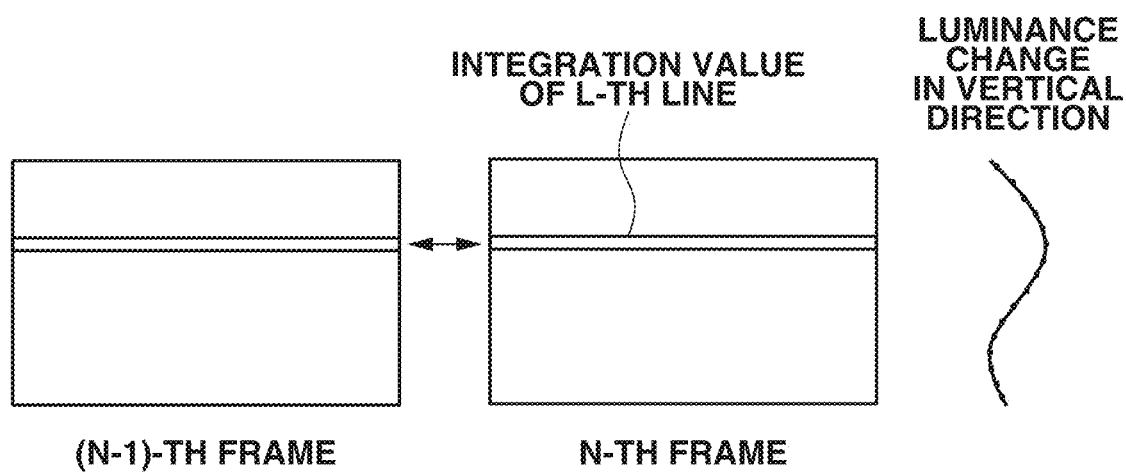
FIG. 9 is a diagram illustrating a luminance change, based on images continuously obtained using a rolling shutter system.

Next, luminance changes in images obtained using a rolling shutter system will be described with reference to FIG. 9. FIG. 9 is a diagram illustrating luminance changes based on images continuously obtained using the rolling shutter system. If a sensor is driven using the rolling shutter system, different exposure/readout timings between the individual sensor rows (line) produce different effects between the individual rows (lines) due to a flickering light source, causing varying luminance changes in the vertical direction on an image.

Thus, with a sensor (the image sensor 101 in the present exemplary embodiment) driven using the rolling shutter system, acquiring an integration value for each row (line) of a captured image makes it possible to extract luminance changes caused by a flickering light source. Specifically, as illustrated in FIG. 9, consecutive luminance changes are extracted on the same line in an (N−1)-th frame and an N-th frame in images obtained by continuously capturing images of a subject. In this case, integration values are calculated for each row based on the captured images corresponding to the N-th frame and the (N−1)-th frame. An integration value may be a luminance signal obtained by multiplying a color signal by a fixed ratio or may be an integration value of color signals as described above for the global shutter system. Calculation of a difference or a ratio by comparing the integration values of the N-th frame and the (N−1)-th frame for each row allows detection of luminance changes in the vertical direction of the captured images (i.e., scanning direction of the sensor) as illustrated in FIG. 9.

Frames to be compared are not limited to consecutive two frames. For example, luminance changes in the vertical direction of images may be calculated by averaging signal values in a plurality of captured images and acquiring an average image, and comparing an integration value of each line in the average image as a reference image and an integration value of each line in the N-th frame.

Analysis on captured images obtained using the rolling shutter system in the above-described method allows detection of the transition of luminance changes in the vertical direction of the above-described captured images, and the luminance changes represent the flickering of a light source (i.e., changes in quantity of light as the flicker).

Next, a method of analyzing the frequency of luminance changes from the transition of luminance changes in images will be described. As a method of converting a signal changing in a time direction into a frequency component, Fourier transformation is generally used. In this case, a signal f(t) changing in the time direction is converted into a function F(ω) based on the frequency.

[Math. 1]

$$F(\omega) = \int_{-\infty}^{\infty} f(t) e^{-i\omega t} dt \quad (3)$$

It is generally known that the exponential function in Formula 3 can be expanded into trigonometric functions of real and imaginary components as represented by the following formula 4.

[Math. 2]

$$F(\omega) = \int f(t) \cdot \cos(\omega t) dt + j \times (-1) \times \int f(t) \cdot \sin(\omega t) dt \quad (4)$$

Let f(t) denote the transition of changes in image signals and dt denote a sampling interval for the transition of change, both of which allows the calculation of an integration value, Formula 4 can be represented by the following formula 5.

$$F(\omega) = A(\omega) + j \times B(\omega) \quad (5)$$

This is a complex function of the frequency ω, and the magnitude is calculated by |F(ω)|. With the transition of luminance changes in images including luminance change components caused by the frequency ω, |F(ω)| will be a large value. With the transition of luminance changes in images including no luminance change components caused by the frequency ω, |F(ω)| will be a small value. In other words, |F(ω)| can be regarded as a flicker level at each frequency. Thus, the calculation of frequency components using Formula 5 described above in a broad detection target frequency range allows detection whether luminance changes caused by a flickering light source (i.e., frequency of changes in quantity of light as flicker) occurs in a broad frequency range.

Unless the luminance change transition includes one or more flickering cycles of a light source (one cycle of changes in quantity of light as flicker), a target frequency can fail to be detected favorably, and another frequency erroneously detected. In view of the foregoing, image capturing of a subject is continued for a period equal to or more than one cycle of a detection target frequency, and detect the above-described frequency (i.e., frequency of changes in quantity of light as flicker) based on images obtained by the image capturing.

Next, an exposure operation performed during flicker detection in step S403 described above will be specifically described. As described above, if an image capturing cycle used in flicker detection and a flickering frequency of a light source (frequency of changes in quantity of light as flicker) are synchronized with each other, it is difficult to effectively detect flicker based on sampled images. Furthermore, aside from an image capturing cycle, also if an exposure time (i.e., shutter speed) set in the image capturing of a subject is synchronized with a flickering frequency of a light source, an effective luminance change is not generated in images obtained in this state, which makes it difficult to effectively detect flicker.

In view of the foregoing, in the present exemplary embodiment, in each image capturing cycle used in flicker detection operation, an exposure time (shutter speed) to be synchronized with each image capturing cycle is set in such a manner as not to be synchronized with a frequency other than any image capturing cycle. More specifically, in detection of flicker, images of a subject are captured using an exposure time (shutter speed) that is 1/N (N is an integer) of an image capturing cycle (frame rate) of detection.

FIG. 10 is a diagram illustrating setting values of exposure times (shutter speeds) in a first pattern of a plurality of image capturing cycles for flicker detection according to the first exemplary embodiment of the present invention. For example, as described above, if a plurality of image capturing cycles for flicker detection are 100 fps, 126 fps, and 159 fps, images of a subject are captured using exposure times as illustrated in FIG. 10.

FIG. 11 is a diagram illustrating setting values of exposure times (shutter speeds) in a second pattern of a plurality of image capturing cycles for flicker detection according to the first exemplary embodiment of the present invention. For example, as described above, if a plurality of image capturing cycles for flicker detection are 100 fps, 133 fps, and 167 fps, images of a subject are captured using exposure times as illustrated in FIG. 11.

As illustrated in FIGS. 10 and 11, acquiring images for flicker detection using an exposure time that is 1/N (N is an integer) of an image capturing cycle (frame rate) for flicker detection prevents synchronization between the exposure time and the frequency of changes in quantity of light as flicker.

If an exposure condition varies among the frequencies of changes in quantity of light as flickers, the flicker level varies, which reduces detection accuracy. In view of the foregoing, in the present exemplary embodiment, the exposure operation performed at the above-described plurality of image capturing cycles based on the photometry result obtained in step S401 prevents the exposure amount from varying for each image capturing cycle, and allows detection of a stable flicker level.

Next, the details of the processing in step S304 described above will be described. The range of frequencies of changes in quantity of light as flickers that can be detected by the camera main body 100 according to the present exemplary embodiment varies based on a sampling cycle on images for detection. From the sampling theorem that, let f [Hz] denote the maximum frequency included in an original signal, it is generally known that sampling performed at a frequency higher than 2f [Hz] allows restoration of the original signal. When changes in quantity of light caused by flicker (flickering of a subject) is regarded as an original signal, sampling at a frequency equal to or higher than 2f [Hz] is used to make a frequency range up to the maximum frequency f [Hz] detectable. In other words, sampling is performed at intervals equal to or smaller than 1/2 f [sec].

Furthermore, with sampling performed at 2f [Hz], a signal with a high frequency exceeding the maximum frequency f [Hz] included in it prevents an original signal from being correctly restored in accordance with the sampling theorem. In this case, a frequency exceeding the limit frequency (so-called Nyquist frequency) results in a detection of a frequency different from the actual frequency due to an aliasing Phenomenon. For example, with sampling performed at 2f [Hz] for a subject under the flickering at a frequency (f+K) [Hz], the frequency K [Hz] exceeding the frequency f [Hz] results in a detection of a frequency (f−K) [Hz] due to the above-described aliasing phenomenon.

In this case, it is difficult to determine whether the detected frequency of changes in quantity of light as the flicker (f−K) [Hz] is a frequency detected due to the aliasing phenomenon caused by the frequency over the Nyquist frequency, or the actual frequency.

In view of the foregoing, aside from the flicker detection processing performed in step S302, in step S304, the camera main body 100 according to the present exemplary embodiment performs sampling at a sampling frequency further higher than the sampling frequency in step S302. Then, flicker is detected based on the acquired signals for detection. The number of signals (data) to be acquired by the sampling may be smaller than the number of pieces of data acquired in step S302 described above. This is because the acquired data is used in the processing in step S304 to determine whether the frequency of changes in quantity of light as flicker detected in step S302 is an actual flickering frequency of the subject or a frequency caused by the aliasing phenomenon, and vast amounts of data is not used. This configuration prevents an erroneous detection of the frequency of changes in quantity of light as flicker at a high frequency over the Nyquist frequency, while making the time taken to perform sampling as short as possible.

Hereinafter, a setting method for a sampling frequency in the processing in step S304 will be described with reference to a specific example. For example, a flickering frequency of a light source such as an LED generally falls within the range of about 50 Hz to 2000 Hz. In this case, a sampling frequency is used to be set to 4000 Hz to correctly detect a maximum frequency of 2000 Hz of flicker to be detected.

Nevertheless, there are also light sources or electronic signboards (digital signage) flickering at frequencies equal to or larger than 2000 Hz, and flicker can fail to be correctly detected at a sampling frequency of 4000 Hz. For example, with a light source flickering at 2500 Hz, a sampling frequency is set to 4000 Hz, with a Nyquist frequency at 2000 Hz. Thus, flicker changing at 2500 Hz exceeds a detection limit by 500 Hz. In this case, due to the aliasing phenomenon with a frequency over the Nyquist frequency, the frequency of the flicker may be observed as 1500 Hz (2000−500).

In view of the foregoing, to correctly detect the frequency of changes in quantity of light as flicker over the Nyquist frequency, sampling at a sampling frequency of 8000 Hz that is a further higher frequency is also performed in addition to 4000 Hz being a first sampling frequency. More specifically, in addition to the sampling performed in step S302 at 4000 Hz as a first sampling frequency, in step S304, sampling is performed at 8000 Hz as a second sampling frequency. For example, if flicker at 1500 Hz is detected in the first sampling, and flicker at 2500 Hz is detected in the second sampling, it can be determined that the frequency of changes in quantity of light of currently-occurring the flicker falls out of the detection target range of the first sampling. In this manner, the validity of the frequency of changes in quantity of light as flicker detected in the first sampling can be determined based on the result of the second sampling, allowing an accurate detection of the frequency of changes in quantity of light as flicker at a frequency over the Nyquist frequency.

As described above, sampling at the second sampling frequency is performed to determine whether the frequency of changes in quantity of light as flicker falls out of the detection target range for the first sampling frequency. Thus, as an analysis method for signals obtained by sampling at the second sampling frequency, a configuration may be used of employing a method simpler than an analysis method for signals obtained by sampling at the first sampling frequency. For example, a configuration is that the frequency of changes in quantity of light as flicker is detected using a so-called zero crossing method that uses sampling data obtained at the second sampling frequency. A detection method for the frequency of changes in quantity of light as flicker according to the present exemplary embodiment that uses the zero crossing method will be described in detail below.

Figure 12A:
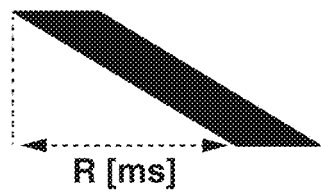
FIGS. 12A and 12B illustrate a difference in signal readout time with respect to a difference in the number of readout lines of an image sensor.
Figure 12B:
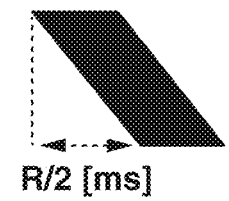
Figure 13A:
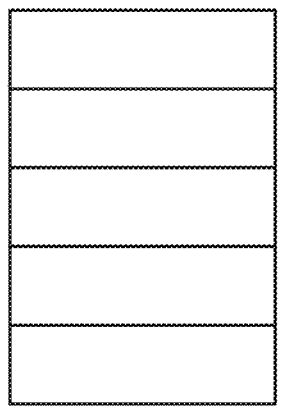
FIGS. 13A to 13C illustrate differences in sampling frequency generated in accordance with the number of samplings in the vertical direction of an image signal.
Figure 13B:
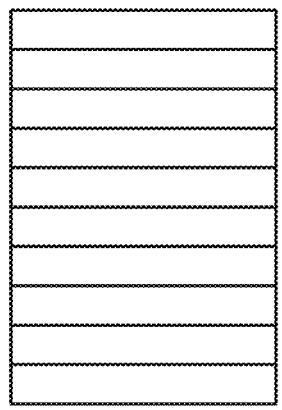
Figure 13C:
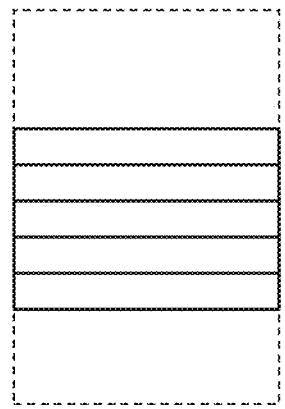

Next, a drive control method for an image sensor at the time of the first or second sampling will be described with reference to FIGS. 12A, 12B, and 13A to 13C. FIGS. 12A and 12B are diagrams illustrating a difference in signal readout time with respect to a difference in the number of readout lines of an image sensor. FIGS. 13A to 13C are diagrams illustrating a difference in a sampling frequency generated in response to the number of samplings in the vertical direction of an image signal.

FIGS. 12A, 12B, and 13A to 13C are all on the assumption on that the image sensor is driven using the rolling shutter system. FIG. 12A illustrates a readout time taken to read out all the lines of the image sensor, and FIG. 12B illustrates a readout time with the number of readout lines of the image sensor reduced to a half of that in FIG. 12A. As illustrated in FIG. 12B, the reduction of (thinning) the number of readout lines from the number illustrated in FIG. 12A shortens the time taken to read out the entire image. With flicker occurring, driving the image sensor using the rolling shutter system has different effects of changes in quantity of light as the flicker between the individual lines. That produces uneven luminance on an image in a stripe-like pattern. With a readout time shorter as illustrated in FIG. 12B, flicker analysis can be performed at a high sampling frequency as compared with the case illustrated in FIG. 12A.

Next, FIGS. 13A and 13B illustrate different numbers of samplings in the vertical direction on images, and FIG. 13C illustrates a case where the number of samplings is the same as that in FIG. 13A, but sampling is performed in a specific region. As the number of samplings in the vertical direction of an image increases, flicker detection can be performed with higher accuracy because the sampling frequency becomes higher. As illustrated in FIG. 13C, by performing sampling in the vicinity of the center alone of the image without changing the number of samplings, the sampling frequency can be applied locally. As described above, as a method for increasing a sampling frequency of the second sampling, the methods described with reference to FIGS. 12A, 12B, and 13A to 13C can be appropriately used. In reading out image signals by driving an image sensor using the global shutter system, images for the second sampling are acquired at a cycle shorter than that in the first sampling.

The above description has been given considering the range of typical flickering frequencies based on light sources such as an LED for the first sampling frequency and the second sampling frequency, but setting methods for the first and second sampling frequencies can be appropriately adjusted. For example, signals obtained near the upper limit of a flicker-detectable frequency range can result in undesirable detection accuracy for the frequency of changes in quantity of light as flicker. In view of the foregoing, a detectable frequency range may be set higher than the frequency of flicker desired to be detected.

Next, a detection method for the frequency of changes in quantity of light as flicker by the above-described zero crossing method using second detection signals acquired in the second sampling will be specifically described. Signal values are acquired from temporally-consecutive two frames of each region illustrated in FIG. 13B or 13C. The signal values may be values of luminance (Y) signals generated by weighted-averaging RGB values using fixed ratios, or values of RGB signals. Through calculation of the difference in signal values of each region acquired over the two frames, a subject component in each region is removed, which extracts the changes in signal value that corresponds to the flickering. Strictly speaking, signal values can be inconsistent with a subject portion due to the movement of a subject between the two frames, but the inconsistency has restrictive influence in acquiring images for detection at a frame rate over 100 fps as described above, which is ignored here.

Even if the difference between two frames including a subject under flickering at a specific frequency is calculated, an amplitude is modulated, but a frequency is not modulated, taking into account the composition of trigonometric functions. Thus, if the differences in signal value between the two frames are arranged in the vertical direction and analyzed, ideally, the differences in signal value pass at a zero point twice in one flickering cycle. However, the signal values are discretely acquired, between which the signal difference that is exactly zero is not always detected. In this case, signs of numerical values vary between the signal values obtained before and after the passage at 0. In other words, counting the number of times the sign changes in the vertical direction (changes from plus to minus or from minus to plus) allows counting of the number of times the signal difference is 0. This allows easy determination of the cycle of flickering generated on images due to the influence of flicker, and calculation of a rough frequency from the number of waves included in a second detection signal.

The processing in step S304 compares the frequency of changes in quantity of light as flicker detected by the above-described method and the frequency of changes in quantity of light as flicker detected earlier in step S302. This allows determination whether the frequency of flicker detected in step S302 falls within a detection target frequency range. If the frequency of the flicker detected in step S302 falls out of the detection target range, the processing in step S308 notifies the user that the frequency of the flicker falls out of the detection target range.

With the above-described configuration, the imaging apparatus according to the present exemplary embodiment can effectively detect flicker stably in a broad frequency range considered to be the frequency of changes in quantity of light as flicker.

Figure 14:
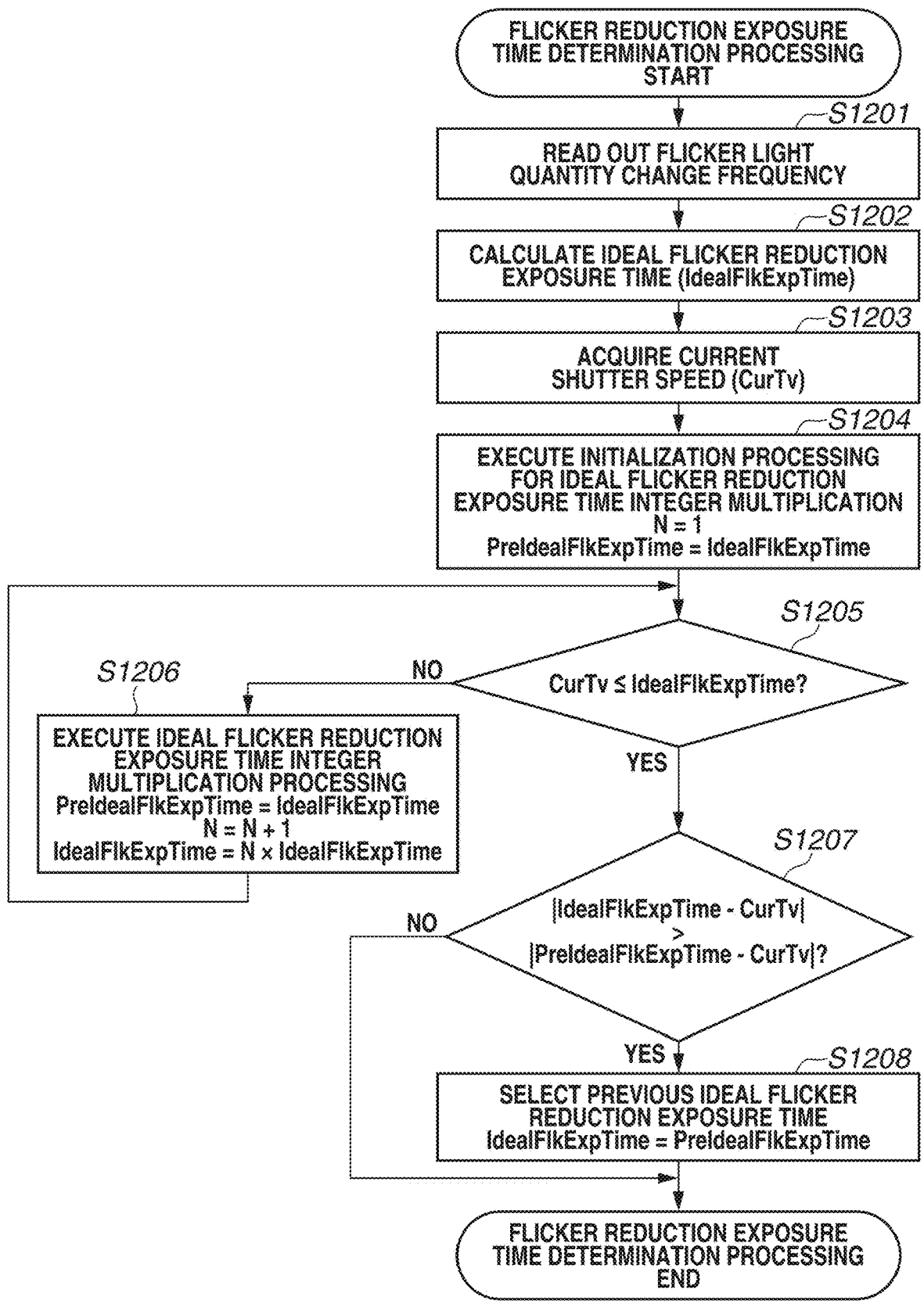
FIG. 14 is a flowchart illustrating flicker reduction exposure time determination processing according to the first exemplary embodiment of the present invention.

Next, the details of the flicker reduction exposure time determination processing performed in step S304 described above will be described with reference to FIG. 14. FIG. 14 is a flowchart illustrating the flicker reduction exposure time determination processing according to the first exemplary embodiment of the present invention. First of all, in step S1201, the CPU 103 reads out from a memory the frequency of changes in quantity of light as flicker detected by the flicker detection processing performed in step S302 described above.

Next, in step S1202, the CPU 103 calculates an ideal exposure time (IdealFlkExpTime) for reducing the influence of the detected flicker based on the inverse number of the frequency of changes in quantity of light as flicker read out in step S1201. For example, if the frequency of changes in quantity of light of the detected flicker is 540.0 Hz, IdealFlkExpTime=1/540.0 is calculated.

Next, in step S1203, the CPU 103 acquires a currently-set shutter speed (CurTv). The current shutter speed CurTv is a shutter speed set by a manual operation of the user, for example. In the present exemplary embodiment, it is assumed that the image capturing mode of the camera main body 100 is preset to a manual mode, and all the exposure control values (parameters) are manually set by the user.

Next, in step S1204, the CPU 103 performs initialization processing for making integer multiplication of the ideal flicker reduction exposure time IdealFlkExpTime. Specifically, in step S1204, integer N=1 is set, and information regarding the ideal flicker reduction exposure time IdealFlkExpTime not subjected to integer multiplication is held as PreIdealFlkExpTime.

Next, in step S1205, the CPU 103 compares the currently-set shutter speed CurTv acquired in step S1203 and the ideal flicker reduction exposure time IdealFlkExpTime. If the value of the currently-set shutter speed CurTv is equal to or smaller than the ideal flicker reduction exposure time IdealFlkExpTime (i.e., the exposure time is shorter) (YES in step S1205), the processing proceeds to step S1207. If the value of the currently-set shutter speed CurTv is larger than the ideal flicker reduction exposure time IdealFlkExpTime (i.e., an exposure time is longer) (NO in step S1205), the processing proceeds to step S1206.

In step S1206, the CPU 103 holds the current ideal flicker reduction exposure time as the previous ideal flicker reduction exposure time PreIdealFlkExpTime, increments the integer N by one, and then multiplies the ideal flicker reduction exposure time by the integer N. Specifically, in step S1206, IdealFlkExpTime is substituted into PreIdealFlkExpTime, the integer N is incremented as N=N+1, and then the ideal flicker reduction exposure time IdealFlkExpTime is multiplied by the integer N. The processing in step S1206 is repeated until it is determined in step S1205 that the currently-set shutter speed is equal to or smaller than the ideal flicker reduction exposure time (CurTv<IdealFlkExpTime). In other words, the processing in step S1206 is processing for approximating the ideal flicker reduction exposure time IdealFlkExpTime to the currently-set shutter speed as close as possible. In the processing, as the current shutter speed CurTv is between the ideal flicker reduction exposure time IdealFlkExpTime and the previous ideal flicker reduction exposure time PreIdealFlkExpTime, for example, the flicker reduction exposure time can be narrowed down to an exposure time close to the shutter speed set by the user.

Next, in step S1207, the CPU 103 determines whether the absolute value of the difference between the ideal flicker reduction exposure time IdealFlkExpTime and the current shutter speed CurTv is larger than the absolute value of the difference between the previous ideal flicker reduction exposure time PreIdealFlkExpTime and the current shutter speed CurTv. If the CPU determines that the absolute value of the difference between the ideal flicker reduction exposure time IdealFlkExpTime and the current shutter speed CurTv is not larger than the absolute value of the difference between the previous ideal flicker reduction exposure time PreIdealFlkExpTime and the current shutter speed CurTv in step S1207 (NO in step S1207), the current flicker reduction exposure time determination processing is ended. This is because it can be determined that the currently-set ideal flicker reduction exposure time IdealFlkExpTime is a value closer to the current shutter speed than the previous ideal flicker reduction exposure time PreIdealFlkExpTime.

On the other hand, if the CPU 103 determines that the absolute value of the difference between the ideal flicker reduction exposure time IdealFlkExpTime and the current shutter speed CurTv is larger than the absolute value of the difference between the previous ideal flicker reduction exposure time PreIdealFlkExpTime and the current shutter speed CurTv in step S1207 (YES in step S1207), it can be determined that the previously-set ideal flicker reduction exposure time PreIdealFlkExpTime is a value closer to the current shutter speed than the currently-set ideal flicker reduction exposure time. In this case, the processing proceeds to step S1208. In step S1208, the CPU 103 replaces the ideal flicker reduction exposure time IdealFlkExpTime with the previously-set ideal flicker reduction exposure time PreIdealFlkExpTime, and ends the current flicker reduction exposure time determination processing.

The above-described flicker reduction exposure time determination processing according to the present exemplary embodiment allows determination of a value close to a shutter speed set by the user as an exposure time (shutter speed) for reducing flicker by way of example. This configuration allows acquirement of an image with reduced influence of flicker while preventing a difference from an image capturing effect intended by the user adjusting a shutter speed from being generated by way of example.

FIGS. 15A and 15B are diagrams illustrating a setting method for an ideal flicker reduction exposure time used for flicker changing at a predetermined frequency of changes in quantity of light according to an exemplary embodiment of the present invention. FIG. 15A illustrates a case where a shutter speed is set to 1/5792.6 by the user, for example (CurTv=1/5792.6). FIG. 15B illustrates a case where a shutter speed is set to 1/250.5 by the user, for example (CurTv=1/250.5).

For example, if the frequency of changes in quantity of light of detected flicker is 540.0 Hz, in the example illustrated in FIG. 15A, the ideal flicker reduction exposure time IdealFlkExpTime is 1/540.0. At the same frequency of changes in quantity of light as flicker, in the example illustrated in FIG. 15B, the ideal flicker reduction exposure time IdealFlkExpTime is 1/270.0. A change in quantity of light as flicker is identical at an integer multiple of a frequency. In addition, when images of a subject are captured at a shutter speed that represents the inverse number of an integer multiple of the flicker frequency among shutter speeds lower than the inverse number of the frequency of changes in quantity of light as flicker, the influence of flicker can be reduced. Thus, if a shutter speed set by the user is equal to or smaller than the inverse number of the frequency of changes in quantity of light of the detected flicker, among the inverse numbers of integer multiples of the flicker frequency, a value with a small difference from the shutter speed set by the user is set as an ideal flicker reduction exposure time.

Figure 16:
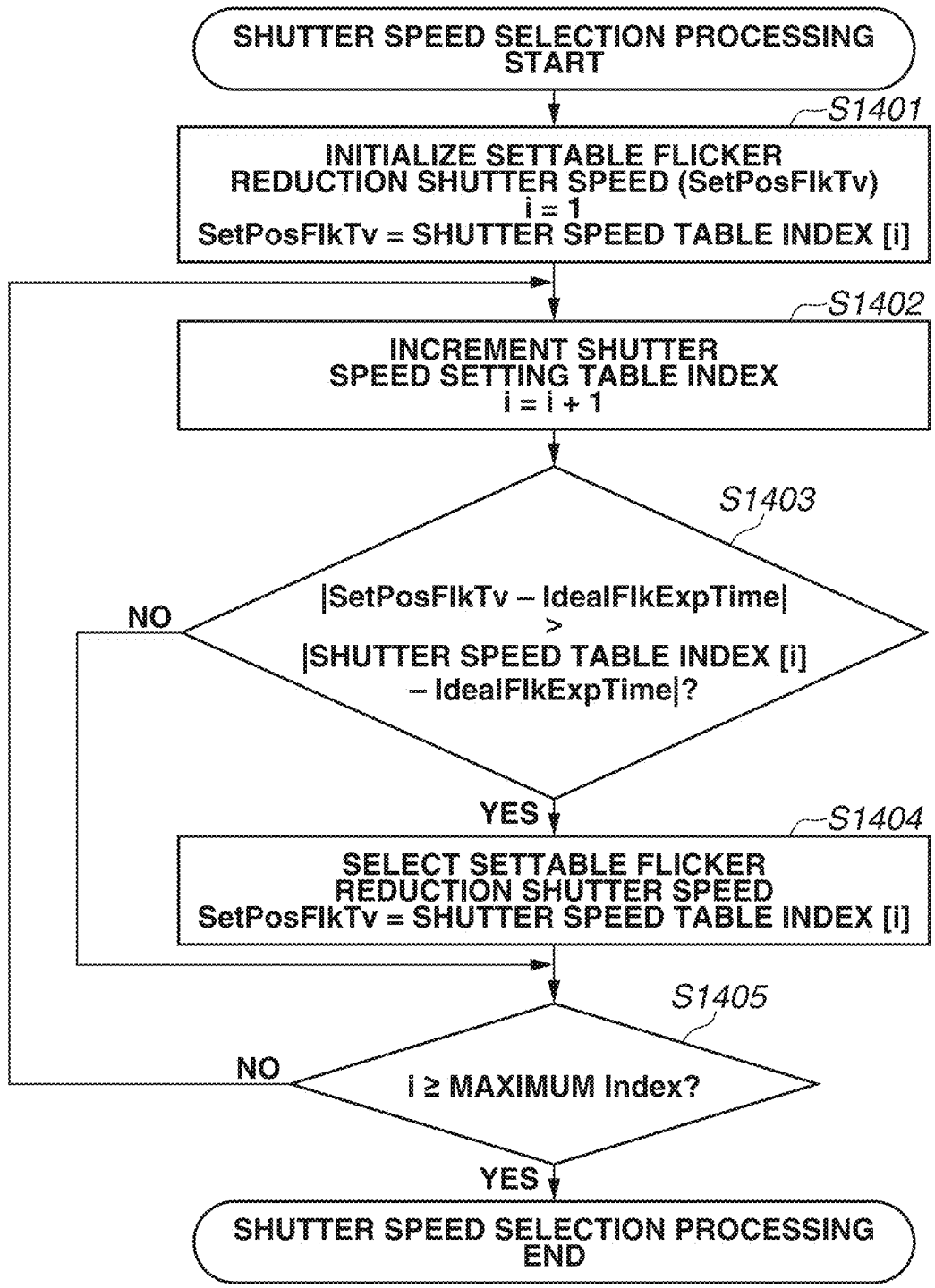
FIG. 16 is a flowchart illustrating shutter speed selection processing according to the first exemplary embodiment of the present invention.

Next, the details of the shutter speed selection processing performed in step S305 described above will be described with reference to FIG. 16. FIG. 16 is a flowchart illustrating the shutter speed selection processing according to the first exemplary embodiment of the present invention. First of all, in step S1401, the CPU 103 performs initialization processing for selecting a shutter speed from the shutter speed setting (index) table described above with reference to FIG. 2. Specifically, in step S1401, the CPU 103 sets index i=1 in the shutter speed setting table, and sets a settable flicker reduction shutter speed (SetPosFlkTv) from the shutter speed setting table. In the present exemplary embodiment, when index i=1 is set, SetPosFlkTv=1/8192.0 is set as illustrated in FIG. 2.

Next, in step S1402, the CPU 103 increments the index i in the shutter speed setting table by one. Next, in step S1403, the CPU 103 determines whether the absolute value of the difference between the settable flicker reduction shutter speed SetPosFlkTv and the above-described ideal flicker reduction exposure time IdealFlkExpTime is larger than the absolute value of the difference between each shutter speed table index [i] in the shutter speed setting table and the above-described ideal flicker reduction exposure time IdealFlkExpTime. If it is determined that the absolute value of the difference between the settable flicker reduction shutter speed SetPosFlkTv and the ideal flicker reduction exposure time IdealFlkExpTime is equal to or smaller than the absolute value of the difference between the shutter speed table index [i] and the ideal flicker reduction exposure time IdealFlkExpTime (NO in step S1403), the processing proceeds to step S1405.

On the other hand, if it is determined that the absolute value of the difference between the settable flicker reduction shutter speed SetPosFlkTv and the ideal flicker reduction exposure time IdealFlkExpTime is larger than the absolute value of the difference between the shutter speed table index [i] and the ideal flicker reduction exposure time IdealFlkExpTime (YES in step S1403), the processing proceeds to step S1404. Then, in step S1404, the CPU 103 selects a settable flicker reduction shutter speed based on the determination result obtained in step S1403. Specifically, in step S1404, the CPU 103 sets the settable flicker reduction shutter speed SetPosFlkTv to the shutter speed [i] corresponding to the current index i in the shutter speed setting table, and advances the processing to step S1405.

Next, in step S1405, the CPU 103 determines whether the index i in the shutter speed setting table is equal to or larger than the maximum index. If it is determined that the current index [i] is smaller than the maximum index (NO in step S1405), the processing returns to the processing in step S1402, and the processing in steps S1402 to S1405 is repeated. The maximum index according to the present exemplary embodiment is set to 600 as illustrated in FIG. 2. If it is determined in step S1405 that the current index [i] has reached the maximum index (YES in step S1405), the CPU 103 selects the current settable flicker reduction shutter speed SetPosFlkTv as a settable flicker reduction shutter speed, and ends the shutter speed selection processing.

In the above-described example, the shutter speed selection processing is performed on all the indices referable in the shutter speed setting table, but the configuration of the processing is not limited to this. For example, if the currently-set shutter speed CurTv has been acquired in the flicker reduction exposure time determination processing, a settable flicker reduction shutter speed may be determined from shutter speeds restricted to the vicinity of the currently-set shutter speed CurTv. Specifically, if a specific value is recorded as the currently-set shutter speed CurTv, the index corresponding to a shutter speed closest to the currently-set shutter speed CurTv is identified. Then, the difference between the ideal flicker reduction exposure time and the shutter speed corresponding to the index, and the difference between the ideal flicker reduction exposure time and the shutter speed corresponding to a different index adjacent to the index are obtained, and the shutter speed from which the difference becomes the smallest is selected as a settable flicker reduction shutter speed. This configuration is effective especially if a specific shutter speed is set by the user. This configuration makes the difference from a shutter speed intended by the user smaller and allows a drastic reduction of the number of indices to be used for comparison, reducing the processing time and load in the shutter speed selection processing.

By performing the above-described shutter speed selection processing, a shutter speed that can effectively reduce the influence of flicker detected in advance can be selected from among shutter speeds settable by the camera main body 100. In other words, the camera main body 100 according to the present exemplary embodiment can select (set) a shutter speed closest to an ideal shutter speed IdealFlkExpTime for reducing the influence of the detected flicker from among settable shutter speeds.

Figure 17A:
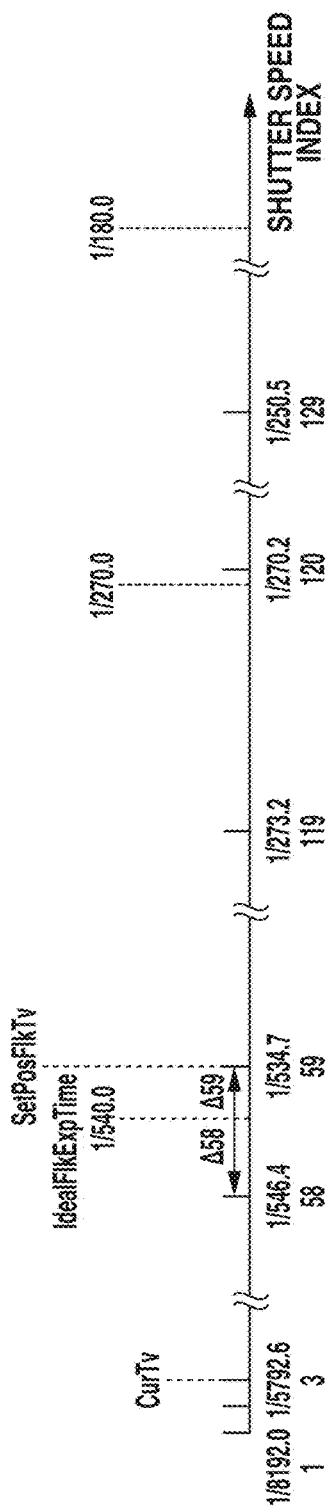
FIGS. 17A and 17B illustrate a relative relationship between an ideal shutter speed for reducing the influence of flicker and a shutter speed selected by the shutter speed selection processing according to the first exemplary embodiment of the present invention.
Figure 17B:
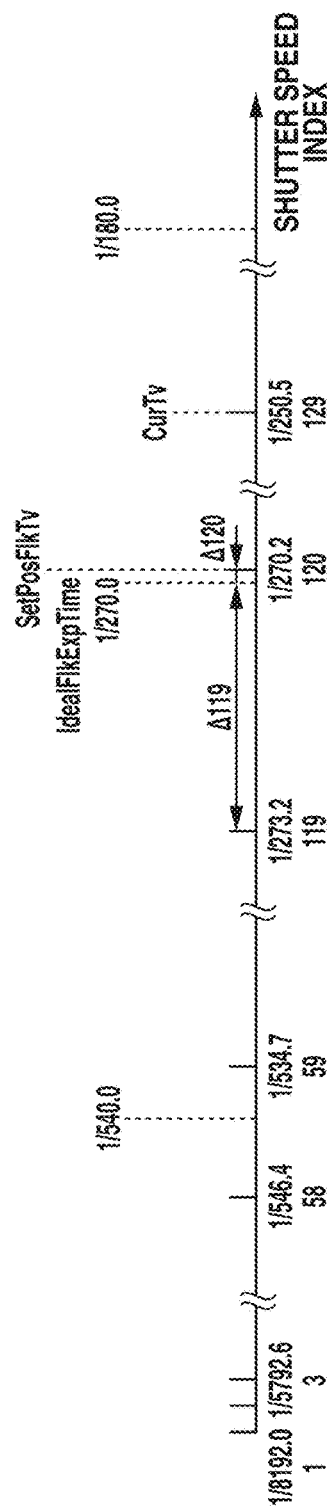

FIGS. 17A and 17B are diagrams illustrating a relative relationship between a shutter speed selected by the shutter speed selection processing according to the first exemplary embodiment of the present invention and an ideal shutter speed for reducing the influence of flicker. In FIGS. 17A and 17B, it is assumed that the frequency of changes in quantity of light as flicker is set to 540.0 Hz and an ideal flicker reduction exposure time IdealFlkExpTime is set to 1/540.0. Then, FIG. 17A illustrates a case where the shutter speed (CurTv) currently set by the user is 1/5792.6, and FIG. 17B illustrates a case where the shutter speed (CurTv) currently set by the user is 1/250.5.

In FIG. 17A, the difference between Tv=1/546.4 indicated by an index 58 in the shutter speed setting table and Tv=1/540.0 as the ideal flicker reduction exposure time IdealFlkExpTime is represented as 458. In addition, in FIG. 17A, the difference between Tv=1/534.7 indicated by an index 59 in the shutter speed setting table and Tv=1/540.0 as the ideal flicker reduction exposure time IdealFlkExpTime is represented as 459. In FIG. 17A, Δ59<Δ58 is satisfied, and Tv=1/534.7 is selected by the above-described shutter speed selection processing as the settable flicker reduction shutter speed SetPosFlkTv.

In FIG. 17B, the difference between Tv=1/273.2 indicated by an index 119 in the shutter speed setting table and Tv=1/270.0 as the ideal flicker reduction exposure time IdealFlkExpTime is represented as Δ119. In addition, in FIG. 17B, the difference between Tv=1/270.2 indicated by an index 120 in the shutter speed setting table and Tv=1/270.0 as the ideal flicker reduction exposure time IdealFlkExpTime is represented as Δ120. In FIG. 17B, Δ120<Δ119 is satisfied, and Tv=1/270.2 is selected by the above-described shutter speed selection processing as the settable flicker reduction shutter speed SetPosFlkTv.

As described above, the camera main body 100 according to the present exemplary embodiment can effectively detect the frequency of changes in quantity of light as flicker occurring in the current image capturing environment, and an ideal shutter speed (exposure time) for reducing the influence of the detected flicker, within a possible shortest time.

The camera main body 100 according to the present exemplary embodiment can set as an ideal shutter speed for reducing the influence of flicker a shutter speed that the shutter speed currently set by the user is reflected in. Thus, the camera main body 100 according to the present exemplary embodiment can detect a shutter speed that can reduce the influence of flicker, while preventing the generation of the difference from an exposure condition or an image capturing effect intended by the user as much as possible.

Furthermore, the camera main body 100 according to the present exemplary embodiment can automatically select (set) a shutter speed closest to an ideal shutter speed that can reduce the influence of flicker from among shutter speeds settable by the camera main body 100. Thus, the camera main body 100 according to the present exemplary embodiment can automatically select (set) a shutter speed that can reduce the influence of flicker, without the user performing manual adjustment of the shutter speed.

Figure 18A:
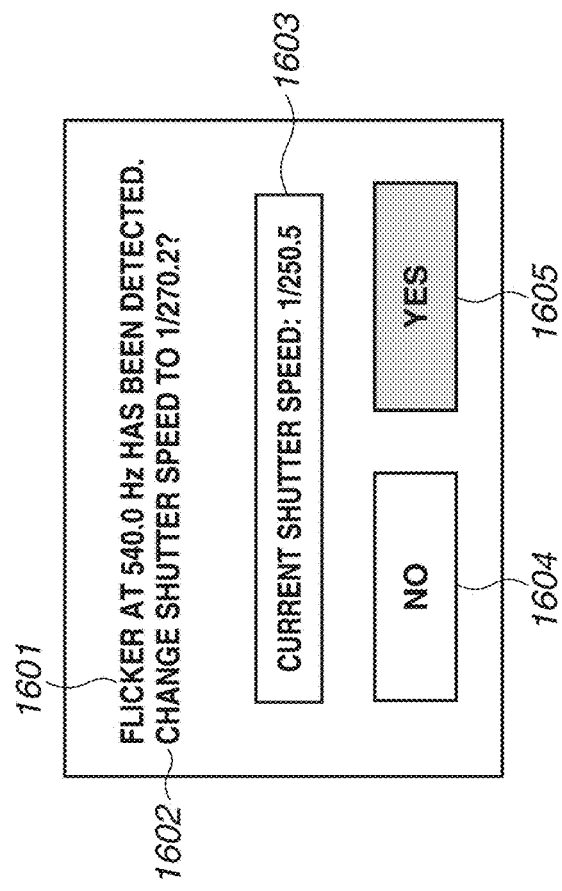
FIGS. 18A and 18B each illustrate a notification image to be displayed on a display unit by display processing according to the first exemplary embodiment of the present invention.
Figure 18B:
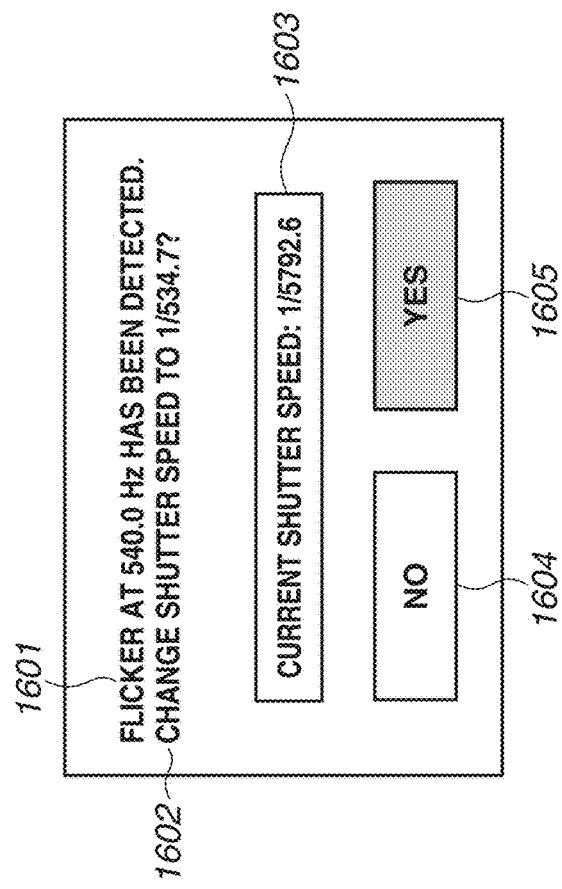

Next, the details of the display processing according to the first exemplary embodiment of the present invention that is performed in step S307 described above will be described with reference to FIGS. 18A, 18B, 17A, and 17B. FIGS. 18A and 18B are diagrams each illustrating a notification image displayed on the display unit 102 by the display processing according to the first exemplary embodiment of the present invention.

Figure 19:
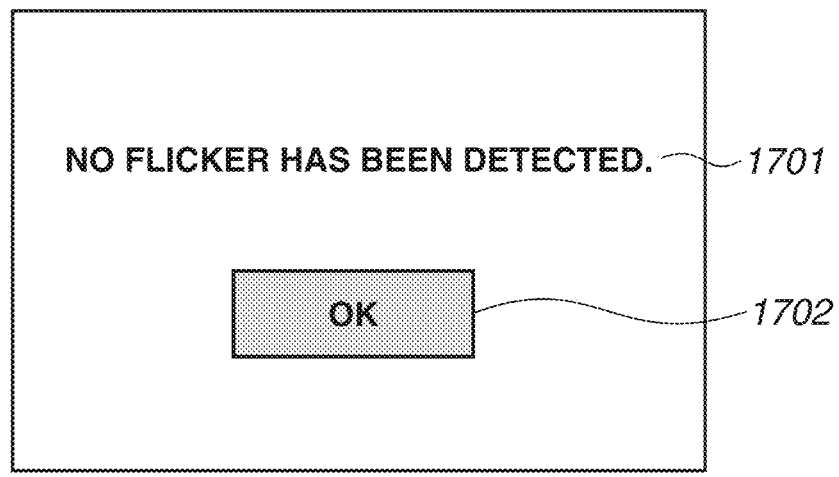
FIG. 19 illustrates a notification image to be displayed with no flicker detected by display processing according to the first exemplary embodiment of the present invention.

FIG. 18A illustrates a case where flicker at a frequency of 540.0 Hz is detected, the current shutter speed CurTv is 1/5792.6, and the settable flicker reduction shutter speed SetPosFlkTv is 1/534.7. FIG. 18B illustrates a case where flicker at a frequency of 540.0 Hz is detected, the current shutter speed CurTv is 1/250.5, and the settable flicker reduction shutter speed SetPosFlkTv is 1/270.2. FIG. 19 is a diagram illustrating a notification image displayed by display processing according to the first exemplary embodiment of the present invention if no flicker is detected.

In a detected flicker region 1601, information indicating the frequency of changes in quantity of light as flicker detected based on the above-described method is displayed (540.0 Hz in the example illustrated in FIGS. 18A and 18B).

In a selectable shutter speed region 1602, a settable flicker reduction shutter speed SetPosFlkTv obtained based on the above-described method is displayed (1/534.7 in FIG. 18A and 1/270.2 in FIG. 18B).

In a current shutter speed region 1603, a shutter speed currently set in the camera main body 100 through manual setting made by the user is displayed (1/5792.6 in FIG. 18A and 1/250.5 in FIG. 18B).

As a first user selection icon 1604, the option to be selected if the user disagrees with the change to a settable flicker reduction shutter speed SetPosFlkTv displayed on the notification screen is displayed. As a second user selection icon 1605, an option to be selected if the user agrees with the change to a settable flicker reduction shutter speed SetPosFlkTv displayed on the notification screen is displayed.

As illustrated in FIG. 19, if flicker at a predetermined level or more has not been detected by the flicker detection processing, an explanatory text 1701 indicating that no flicker has been detected, and an icon 1702 via which the user can enter confirmation are displayed on the display unit 102.

As described above, if flicker with a predetermined frequency of changes in quantity of light has been detected by the flicker detection processing, various icons and texts as illustrated in FIGS. 18A and 18B are displayed on the display unit 102, and the user can be prompted to change a shutter speed. This configuration makes it easy to set a shutter speed that can reduce the influence of flicker, while reducing the shutter speed adjustment work that can reduce the influence of flicker through manual operation of the user, for example. The camera main body 100 according to the present exemplary embodiment of the present invention can therefore perform image capturing while reducing the influence of flicker in a broad range of frequencies of changes in quantity of light, irrespective of the light source, without complicated operation, and reduce the unevenness on images attributed to flicker.

Figure 20:
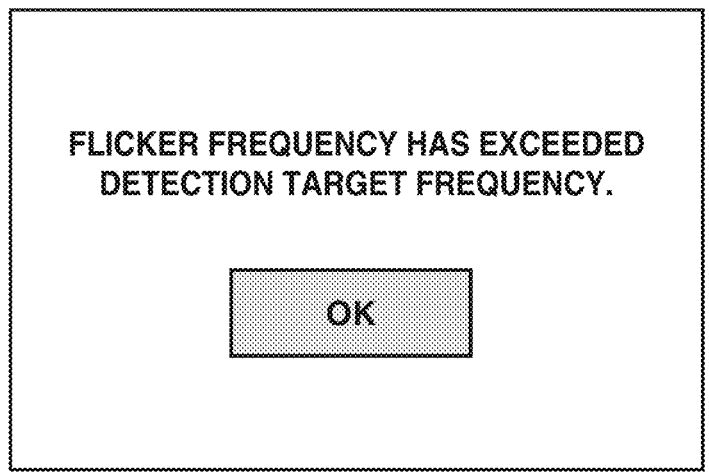
FIG. 20 illustrates a notification image to be displayed with a flicker frequency out of a detection target frequency range by display processing according to the first exemplary embodiment of the present invention.

As described above, if it is determined in the processing in step S304 that the frequency of changes in quantity of light of the currently-occurring flicker has exceeded the detection target range, in step S308, the user is notified that the flicker having frequency of changes in quantity of light falling out of the detection target range has occurred. FIG. 20 is a diagram illustrating a notification image displayed by display processing according to the first exemplary embodiment of the present invention if a flicker frequency has exceeded the detection target frequency range. As illustrated in FIG. 20, if the frequency of changes in quantity of light of the currently-occurring flicker falls out of the accurately-detectable frequency range, the user can easily recognize the fact, allowing reduction of the times a defective image caused by the influence of flicker is acquired.

Figure 21:
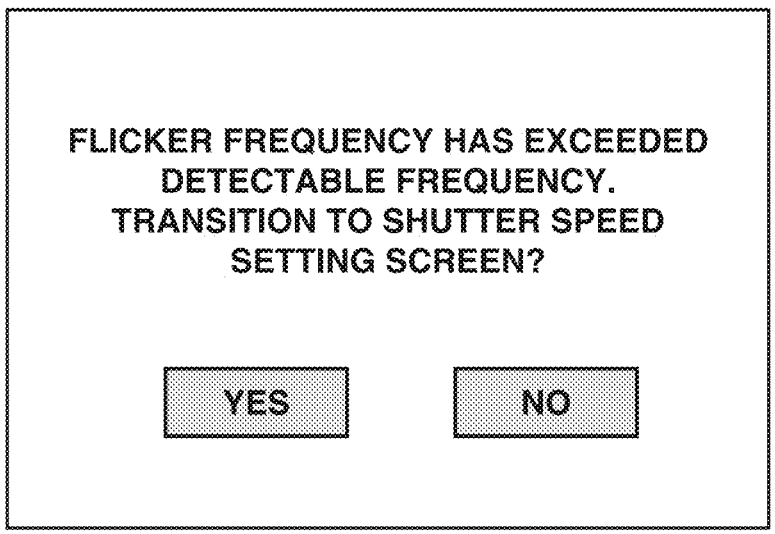
FIG. 21 illustrates a notification image to be displayed for guiding a user to a method of manually setting a shutter speed with a flicker frequency out of a detection target frequency range by display processing according to the first exemplary embodiment of the present invention.

The camera main body 100 according to the present exemplary embodiment supports manual changes of a shutter speed, even if the camera main body 100 fails to correctly detect the frequency of changes in quantity of light as flicker by automatic detection. Thus, as illustrated in FIG. 21, if the frequency of the currently-occurring flicker exceeds the detection range, the user may be prompted to switch the screen to the operation screen for manually changing the shutter speed. FIG. 21 is a diagram illustrating a notification image displayed by display processing according to the first exemplary embodiment of the present invention for guiding the user to a method of manually setting a shutter speed if the flicker frequency has exceeded the detection target frequency range. This configuration allows reduction of the number of operation procedures taken by the user to transition to the flicker manual detection state from the flicker automatic detection state. As the processing in step S308, the screen illustrated in FIG. 19 may be displayed.

A method of notifying the user of the frequency of changes in quantity of light as flicker and a shutter speed that can reduce the influence of flicker, and a method of changing a shutter speed are not limited to the above-described methods. For example, in the above-described example, a case where a notification image is displayed on the display unit 102 has been described. Alternatively, a notification image may be displayed on another display device or an external device connected to the camera main body 100. The notification method is not limited to image display. Various notification methods such as voice navigation, and a change in a lighting state or a lighting color of a lamp (not illustrated) provided in the camera main body 100 can be employed instead.

In the camera main body 100 according to the present exemplary embodiment, a method is used of asking the user whether to change to a settable flicker reduction shutter speed, but a change method is not limited to this. For example, a shutter speed may be automatically changed to a settable flicker reduction shutter speed without the consent of the user, or whether to ask the user whether to change to a settable flicker reduction shutter speed may be switched depending on the image capturing mode.

In this case, if the image capturing mode is set to an automatic mode in which the camera main body 100 automatically determines parameters related to exposure control, the camera main body 100 automatically sets a settable flicker reduction shutter speed. On the other hand, if the image capturing mode is set to a manual mode in which the user manually set parameters related to exposure control (exposure control values), a method of asking the user whether to change a shutter speed is employed as in the above-described example.

The description has been given of a case where the camera main body 100 according to the present exemplary embodiment uses an electronic shutter as described above, but the type of the shutter is not limited to this. For example, the exposure time of the image sensor 101 may be adjusted to be suitable for a shutter speed, using the mechanical shutter 104.

When images of a subject are captured at a shutter speed set to a high speed using the mechanical shutter 104, movement timings of the mechanical shutter 104 can be inconsistent with an ideal exposure time depending on a physical characteristic change or an environmental variation of the mechanical shutter 104. In other words, if the shutter speed set as a settable flicker reduction shutter speed SetPosFlkTv is a high speed, image capturing of a subject can fail to be performed using an exposure time that can correctly reduce flicker influence.

In view of the foregoing, in adjusting an exposure time using the mechanical shutter 104, a settable flicker reduction shutter speed SetPosFlkTv may be restricted in such a manner that a shutter speed is a predetermined speed or more. The predetermined speed (shutter speed) is set to a value at which a time lag (i.e., error) between the ideal exposure time and an exposure timing and a light shielding timing of the image sensor 101 driven by the mechanical shutter 104 falls within a predetermined range. In the present exemplary embodiment, the predetermined shutter speed is set to 1/4000 seconds as an example. In this case, a settable flicker reduction shutter speed is determined using the above-described shutter speed setting table while excluding indices corresponding to shutter speeds equal to or smaller than 1/4000 seconds, or using a new data table.

The camera main body 100 according to the present exemplary embodiment may enable dynamic adjustment whether to use an electronic shutter or the mechanical shutter 104 depending on the value of the settable flicker reduction shutter speed SetPosFlkTv. For example, if the shutter speed is set to a speed higher than 1/4000 seconds, the electronic shutter alone may be made available, and if the shutter speed is set to one of the other shutter speeds, both an electronic shutter and the mechanical shutter 104 may be made available.

A second exemplary embodiment will be described. In the above-described first exemplary embodiment, the configuration of notifying a user of a single settable flicker reduction shutter speed has been described. In contrast to this, in the present exemplary embodiment, a configuration of notifying a user of a plurality of options as settable flicker reduction shutter speeds will be described with reference to FIGS. 22A and 22B. Configurations and basic drive methods for the camera main body 100, the lens unit 200, and the light emission device 300, which serve as an imaging apparatus according to the present exemplary embodiment, are substantially the same as those in the above-described first exemplary embodiment, and like numbers refer to like components. Thus, redundant descriptions will be omitted. The present exemplary embodiment is different from the above-described first exemplary embodiment in the display processing performed in step S307.

FIGS. 22A and 22B are diagrams each illustrating a notification image to be displayed on the display unit 102 by display processing according to the second exemplary embodiment of the present invention. FIG. 22A illustrates a case where flicker at a frequency of 540.0 Hz is detected, the current shutter speed CurTv is 1/5792.6, and the settable flicker reduction shutter speed SetPosFlkTv is 1/534.7. FIG. 22B illustrates a case where flicker at a frequency of 540.0 Hz is detected, the current shutter speed CurTv is 1/250.5, and the settable flicker reduction shutter speed SetPosFlkTv is 1/270.2.

In a detected flicker region 1801, information indicating the frequency of changes in quantity of light of detected flicker is displayed. In a current shutter speed region 1802, a shutter speed currently set in the camera main body 100 through manual setting made by the user is displayed (1/5792.6 in FIG. 22A and 1/250.5 in FIG. 22B).

In a selectable shutter speed first candidate region 1803, a settable flicker reduction shutter speed SetPosFlkTv obtained through the method described in the first exemplary embodiment is displayed as a first candidate of a shutter speed selectable by the user. In the selectable shutter speed first candidate region 1803, 1/534.7 is displayed in FIG. 22A and 1/270.2 is displayed in FIG. 22B.

In a selectable shutter speed second candidate region 1804, the shutter speed corresponding to an index at which the difference from the ideal flicker reduction exposure time IdealFlkExpTime is the second smallest after the settable flicker reduction shutter speed SetPosFlkTv is displayed as a second candidate of a shutter speed selectable by the user. In the selectable shutter speed second candidate region 1804, 1/546.4 is displayed in FIG. 22A and 1/273.2 is displayed in FIG. 22B.

In a selectable shutter speed additional candidate region 1805, if a shutter speed that further reduces the influence of flicker exists, the shutter speed is displayed as an additional candidate of a shutter speed selectable by the user, irrespective of the difference from the current shutter speed CurTv. For example, FIG. 22A illustrates an example in which 1/270.2 close to Tv=1/270.0 obtained by doubling Tv=1/540.0 as the ideal flicker reduction exposure time IdealFlkExpTime is displayed in the selectable shutter speed additional candidate region 1805. With flicker at a frequency of 540.0 Hz detected, the difference between Tv=1/270.2 and the current shutter speed CurTv is larger, but the reduction of the influence of flicker caused at Tv=1/270.2 is larger than that at the settable flicker reduction shutter speed SetPosFlkTv (1/534.7).

As shutter speed selection icons 1806, icons for the user to select a candidate of a selectable shutter speed are displayed. Out of the icons, a white arrow indicates that no candidate shutter speed exists, and a black arrow indicates that a candidate shutter speed exists. In FIG. 22A, no SetPosFlkTv candidate other than the candidate displayed in the selectable shutter speed first candidate region 1803 exists, so that a white arrow icon is displayed next to the selectable shutter speed first candidate region 1803. The same applies to the example illustrated in FIG. 22B. In FIG. 22A, a shutter speed (1/180.0) exists that is other than the shutter speed displayed in the selectable shutter speed additional candidate region 1805 that causes a larger reduction of the influence of flicker, so that a black arrow icon is displayed next to the selectable shutter speed additional candidate region 1805. Also in FIG. 22B, a shutter speed (1/135.0) exists that is other than the shutter speed displayed in the selectable shutter speed additional candidate region 1805 that has a larger reduction of the influence of flicker, so that a black arrow icon is displayed next to the selectable shutter speed additional candidate region 1805.

As described above, the camera main body 100 according to the present exemplary embodiment can notify a user of a plurality of candidates other than a single settable flicker reduction shutter speed SetPosFlkTv, as shutter speeds that can reduce the influence of flicker. This configuration allows easy setting of a shutter speed desired by the user, from among a plurality of candidates that can reduce the influence of flicker, while reducing the shutter speed adjustment work that reduces the influence of flicker through manual operation by the user, for example. Thus, the camera main body 100 according to the present exemplary embodiment of the present invention can perform image capturing while reducing the influence of flicker in a broad range of frequencies of changes in quantity of light, irrespective of the light source without a complicated operation, to reduce the unevenness on images attributed to flicker.

A third exemplary embodiment will be described. In the above-described first exemplary embodiment, the example of displaying a specific notification screen on the display unit 102 has been described. In contrast to this, in the present exemplary embodiment, a configuration of performing flicker detection processing during live view display of performing sequential display of captured images will be described with reference to FIG. 23. Configurations and basic drive methods for the camera main body 100, the lens unit 200, and the light emission device 300, which serve as an imaging apparatus according to the present exemplary embodiment, are substantially the same as those in the above-described first exemplary embodiment, and like numbers refer to like components. Redundant descriptions will be omitted.

Figure 23:
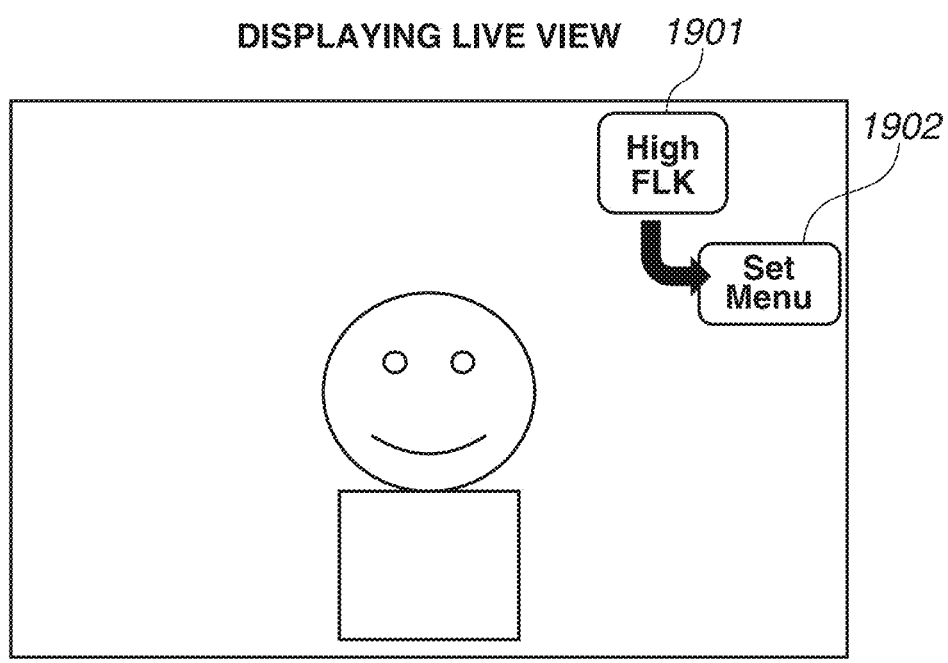
FIG. 23 illustrates a transitional screen to flicker reduction processing to be displayed during live view display according to a third exemplary embodiment of the present invention.

FIG. 23 is a diagram illustrating a transitional screen to flicker reduction processing to be displayed during live view display according to the third exemplary embodiment of the present invention. In the present exemplary embodiment, a configuration of performing live view display on the display unit 102 will be described, but live view display may be performed on an electronic viewfinder (not illustrated). During the live view display, sampling (charge accumulation) for flicker detection is performed on the image sensor 101 at a timing different from a charge accumulation timing for obtaining captured images to be used for live view display.

As illustrated in FIG. 23, a flicker detection icon 1901 is an icon for displaying that flicker has been detected in response to a detection of flicker through the flicker detection processing described above in the above-described first exemplary embodiment. If a flicker detection processing different from the above-described flicker detection processing is performable, a detected state may be similarly displayed using the flicker detection icon 1901, or an icon different from the flicker detection icon 1901 may be used. The different flicker detection processing here can be assumed to be processing of detecting specific flicker (100 Hz, 120 Hz) occurring due to a change in a commercial power frequency.

In an embodiment, the flicker detection icon 1901 is not displayed unless flicker is detected, or while the flicker detection icon 1901 is always displayed, a displayed item can be changed (updated) depending on whether flicker is detected. Furthermore, the CPU 103 may control the flicker detection processing to be performed in response to a press of the flicker detection icon 1901 by the user.

A flicker reduction menu transition icon 1902 is an icon for switching a screen displayed on the display unit 102 to one of the notification screens described in the above-described first and second exemplary embodiments in response to a press (touch) of the flicker reduction menu transition icon 1902 by the user. In other words, the camera main body 100 according to the present exemplary embodiment can switch the screen directly to a notification screen during live view display without the user viewing another user interface such as a menu screen.

As described above, the camera main body 100 according to the present exemplary embodiment can make the transition to detection of flicker changing in a broad frequency range and perform image capturing with reduced influence of flicker even in a subject image capturing state such as during the live view display through a simple operation performed by the user. This configuration allows easy setting of a shutter speed desired by the user from among a plurality of candidates that can reduce the influence of flicker, while reducing the number of manual operation procedures to be taken by the user for flicker detection. The camera main body 100 according to an exemplary embodiment of the present invention can therefore perform image capturing while reducing the influence of flicker in a broad range of frequencies of changes in quantity of light, irrespective of the light source, without a complicated operation, and reduce the unevenness on images attributed to flicker.

A fourth exemplary embodiment will be described. In the above-described first exemplary embodiment, the flicker reduction exposure time determination processing performed with the current shutter speed CurTv preset has been described. In contrast to this, in the present exemplary embodiment, flicker reduction exposure time determination processing performed with no specific shutter speed (CurTv) set through manual operation of the user by way of example will be described. Configurations and basic drive methods for the camera main body 100, the lens unit 200, and the light emission device 300, which serve as an imaging apparatus according to the present exemplary embodiment, are substantially the same as those in the above-described first exemplary embodiment, and like numbers refer to like components. Redundant descriptions will be omitted.

Image capturing modes settable in the camera main body 100 include a priority mode in which an exposure control value is manually set by the user and other exposure control values are automatically set, in addition to the automatic mode and the manual mode described above. The camera main body 100 according to the present exemplary embodiment allows a shutter speed priority mode in which the user can manually set a shutter speed by way of example to be set as the priority mode.

For example, in an automatic exposure control state in which the image capturing mode of the camera main body 100 is set to an automatic mode, no shutter speed desired by the user is set by the user. Thus, the determination of an ideal flicker reduction exposure time IdealFlkExpTime in which a current shutter speed CurTv is reflected will not be always made in the flicker reduction exposure time determination processing in the above-described first exemplary embodiment.

In view of the foregoing, in the present exemplary embodiment, an ideal flicker reduction exposure time IdealFlkExpTime is determined based on a determination result as to whether the current shutter speed CurTv is a shutter speed CurUserTv manually set by the user. Specifically, in the camera main body 100 according to the present exemplary embodiment, the CPU 103 determines whether CurTv CurUserTv is satisfied. Then, if it is determined by the determination that CurTv CurUserTv is satisfied, the CPU 103 determines a shutter speed with the smallest difference from the ideal flicker reduction exposure time in the shutter speed setting table as a settable flicker reduction shutter speed.

The above-described configuration applied to the above-described flicker reduction exposure time determination processing will be described. The processing in step S1203 and the processing in step S1205 and subsequent steps are cut. In this case, the exposure time that represents the inverse number of the frequency of changes in quantity of light of the detected flicker is set as the ideal flicker reduction exposure time IdealFlkExpTime, but the ideal flicker reduction exposure time is not limited to this. For example, as described above in the second exemplary embodiment, to further reduce the influence of flicker, a settable flicker reduction shutter speed may be set in such a manner that the difference from a value obtained by multiplying an ideal flicker reduction exposure time by an integer N is the smallest. In this case, comparison between a shutter speed settable according to the shutter speed setting table and an integer multiple value of the ideal flicker reduction exposure time IdealFlkExpTime is repeated. Then, from among the obtained values, a shutter speed with the smallest difference is selected as the settable flicker reduction shutter speed SetPosFlkTv.

For example, in the above-described first and second exemplary embodiments, the value of the settable flicker reduction shutter speed SetPosFlkTv is determined considering the difference from the current shutter speed CurTv on the assumption of the current shutter speed CurTv set, but a determination method is not limited to this. For example, the camera main body 100 may compare differences from the shutter speed corresponding to each index for each frequency of changes in quantity of light as the flicker and each inverse number of an integer multiple thereof, and determine the value with the smallest difference as the settable flicker reduction shutter speed SetPosFlkTv. At this time, the range of frequencies of changes in quantity of light as flickers that can be reduced by shutter speeds settable in the camera main body 100 is defined, and the inverse numbers of frequencies falling within the range are used as comparison targets.

The determination as to whether CurTv≠CurUserTv is satisfied according to the present exemplary embodiment may be made based on the image capturing mode currently set in the camera main body 100.

As described above, even with no shutter speed set by the user, the camera main body 100 according to the present exemplary embodiment can calculate an optimum shutter speed that can effectively reduce the influence of flicker changing in a broad frequency range. This configuration allows easy setting of a shutter speed that can reduce the influence of flicker most effectively, irrespective of the image capturing condition of the camera main body 100, without a complicated operation.

The camera main body 100 according to the present exemplary embodiment of the present invention can therefore perform image capturing while reducing the influence of flicker in a broad range of frequencies of changes in quantity of light, irrespective of the light source, without a complicated operation, and reduce the unevenness on images attributed to flicker.

A fifth exemplary embodiment will be described. In the above-described first exemplary embodiment, the flicker reduction processing related to subject image capturing to be performed in acquiring still images has been described. In contrast to this, in the present exemplary embodiment, flicker reduction processing related to subject image capturing to be performed in acquiring moving images will be described. Configurations and basic drive methods for the camera main body 100, the lens unit 200, and the light emission device 300, which serve as an imaging apparatus according to the present exemplary embodiment, are substantially the same as those in the above-described first exemplary embodiment, and like numbers refer to like components. Redundant descriptions will be omitted.

In acquiring moving images, the range of settable shutter speeds is limited by the update cycle of frames included in a moving image. In other words, an unsettable shutter speed exists depending on the recording frame rate of the moving image.

Settable shutter speeds include values undesirable as shutter speeds to be used in acquiring a moving image. For example, if the shutter speed is short, the exposure time in one frame is short, and the temporal difference between frames included in a moving image is large. The smooth motion of subjects in the moving image does not appear.

In view of the foregoing, in the present exemplary embodiment, the longest exposure time settable at a set frame rate of a moving image is determined as an ideal flicker reduction exposure time in the flicker reduction processing performed in acquiring a moving image. In some cases, the flicker reduction exposure time does not match the settable flicker reduction shutter speed. Thus, if a settable flicker reduction shutter speed selected based on a newly-determined ideal flicker reduction exposure time is a value unsettable at the current frame rate of the moving image, the settable flicker reduction shutter speed is adjusted. Specifically, a shutter speed closest to the newly-determined ideal flicker reduction exposure time is selected as a settable flicker reduction shutter speed from among shutter speeds not restricted by the frame rate of the moving image.

In the present exemplary embodiment, the processing for comparison with the current shutter speed CurTv in the above-described flicker reduction exposure time determination processing is omittable. However, the longest exposure time of the exposure times with differences from the current shutter speed CurTv that fall within a predetermined range, among ideal flicker reduction exposure times (integer multiples thereof), may be selected as a final ideal flicker reduction exposure time.

As described above, the camera main body 100 according to the present exemplary embodiment can perform detection of flicker changing in a broad frequency range, and image capturing with reduced influence of flicker while preventing quality degradation of a moving image also at the time of subject image capturing for acquiring a moving image. With this configuration, the camera main body 100 according to the present exemplary embodiment can easily set a shutter speed that can reduce the influence of flicker without an additional operation performed by the user both in acquiring still images and acquiring moving images. The camera main body 100 according to the present exemplary embodiment of the present invention can therefore perform image capturing while reducing the influence of flicker in a broad range of frequencies of changes in quantity of light, irrespective of the light source, without a complicated operation, and reduce the unevenness on images attributed to flicker.

A sixth exemplary embodiment will be described. In the above-described first exemplary embodiment, the configuration of setting an ideal flicker reduction exposure time in such a manner that the difference from the current shutter speed CurTv is smaller has been described. In contrast to this, in the present exemplary embodiment, a method will be described of setting an ideal flicker reduction exposure time that can reduce the influence of camera shake or subject blurring. Configurations and basic drive methods for the camera main body 100, the lens unit 200, and the light emission device 300, which serve as an imaging apparatus according to the present exemplary embodiment, are substantially the same as those in the above-described first exemplary embodiment, and like numbers refer to like components. Redundant descriptions will be omitted.

A longer shutter speed (exposure time) is typically more likely to cause an image with a blurred subject to be captured due to camera shake or subject motion (so-called subject blurring) in image capturing. In other words, to reduce blurring in an image, a shutter speed is set as short as possible.

The camera main body 100 according to the present exemplary embodiment determines an ideal flicker reduction exposure time shorter than a predetermined exposure time in the flicker reduction exposure time determination processing according to the above-described first exemplary embodiment. Any value may be set as the predetermined exposure time as long as subject blurring in an image can be reduced. In the present exemplary embodiment, the predetermined exposure time is set to 1/125 seconds as an example.

In the present exemplary embodiment, the processing for comparison with the current shutter speed CurTv in the above-described flicker reduction exposure time determination processing is omittable. However, an ideal flicker reduction exposure time among ideal flicker reduction exposure times (integer multiples thereof) may be determined in such a manner that the ideal flicker exposure time is shorter than a predetermined exposure time, the difference between the ideal flicker exposure time and the current shutter speed CurTv falling within a predetermined range.

If a condition for reducing blurring (for example, specific image capturing scene (sport scene, etc.)) is set as an image capturing condition of the camera main body 100, an ideal flicker reduction exposure time that reduces the influence of subject blurring may be set.

As described above, the camera main body 100 according to the present exemplary embodiment can perform detection of flicker changing in a broad frequency range, and image capturing with reduced influence of flicker while preventing subject blurring on images. With this configuration, the camera main body 100 according to the present exemplary embodiment can easily set a shutter speed that can reduce the influence of flicker, without an additional operation performed by the user, even with a specific image capturing condition intended to reduce blurring set. The camera main body 100 according to an exemplary embodiment of the present invention can therefore perform image capturing while reducing the influence of flicker in a broad range of frequencies of changes in quantity of light, irrespective of the light source, without a complicated operation, and reduce the unevenness on images attributed to flicker.

A seventh exemplary embodiment will be described. In the present exemplary embodiment, flicker reduction processing performed in performing light emission image capturing using the light emission device 300 will be described. Configurations and basic drive methods for the camera main body 100, the lens unit 200, and the light emission device 300, which serve as an imaging apparatus according to the present exemplary embodiment, are substantially the same as those in the above-described first exemplary embodiment, and like numbers refer to like components. Redundant descriptions will be omitted.

In the light emission image capturing that uses the light emission device 300, the range of settable flicker reduction shutter speeds is limited by a synchronous speed determined based on an exposure timing of the image sensor 101 and a light emission timing of the light emission device 300. More specifically, the camera main body 100 according to the present exemplary embodiment sets a settable flicker reduction shutter speed from among candidates of shutter speeds lower than the synchronous speed of the light emission device 300. Specifically, the CPU 103 determines whether to perform light emission image capturing that uses the light emission device 300. Then, if it is determined by the determination that the light emission image capturing is to be performed, the range of shutter speeds selectable in the shutter speed setting table are limited to the range lower than the synchronous speed of the light emission device 300.

In the present exemplary embodiment, the processing for comparison with the current shutter speed CurTv in the above-described flicker reduction exposure time determination processing is omittable. However, a synchronous speed of the light emission device 300 that has the smallest difference from the current shutter speed CurTv of the ideal flicker reduction exposure times (integer multiples thereof) may be selected as a final ideal flicker reduction exposure time.

As described above, the camera main body 100 according to the present exemplary embodiment can perform detection of flicker changing in a broad frequency range, and image capturing with reduced influence of flicker while maintaining a state in which a subject is appropriately illuminated, even at the time of light emission image capturing that uses a light emission device. With this configuration, the camera main body 100 according to the present exemplary embodiment can easily set a shutter speed that can reduce the influence of flicker at the time of light emission image capturing, without an additional operation performed by the user. The camera main body 100 according to the present exemplary embodiment of the present invention can therefore perform image capturing while reducing the influence of flicker in a broad range of frequencies of changes in quantity of light, irrespective of the light source, without a complicated operation, and reduce the unevenness on images attributed to flicker.

The exemplary embodiments of the present invention have been described above, but the present invention is not limited to these exemplary embodiments, and various modifications and changes can be made without departing from the gist thereof. For example, in the above-described exemplary embodiments, the description has been given on the assumption of a digital camera as an example of an imaging apparatus for carrying out the present invention, but the imaging apparatus is not limited to this. For example, an imaging apparatus other than a digital camera, such as a portable devices including a digital video camera and a smartphone, a wearable device, a car-mounted camera, and a security camera, may be employed.

In the above-described exemplary embodiments, the configurations have been described that can detect and reduce flicker changing in a broad frequency range, without limiting a light source to a specific light source, but a configuration is not limited to these. For example, a configuration of preliminarily designating a specific light source, and then detecting flicker based on a frequency region likely to occur in. In this case, a configuration may be employed of preparing a data table for each light source (or similar light source group), similarly to the shutter speed setting table illustrated in FIG. 2 to limit the shutter speeds to the shutter speeds highly likely to be set for each data table with reference to cycles of changes in quantity of light of light sources. This configuration allows effective setting of a shutter speed that can reduce the influence of the flicker based on the flicker highly likely to occur with each light source, allowing reduction of the amount of data in the data table as far as possible while effectively reducing the influence of flicker.

In the above-described exemplary embodiments, the configurations have been described in which the components included in an imaging system with the CPU 103 as the center component cooperatively operate to control the general operation of the apparatus, but the configurations are not limited to these. For example, a configuration may be employed of preliminarily storing (computer) programs following the processing of the flowcharts illustrated in the above-described diagrams into a ROM of the camera main body 100, and then controlling the general operation of the imaging system by a microprocessor such as the CPU 103 running the programs. The programs that have the functionality of a program can be in any format, such as an object code, a program to be run by an interpreter, and script data to be supplied to an OS. Examples of a recording medium for feeding programs may include a hard disc, a magnetic recording medium such as a magnetic tape, and an optical/magneto-optical medium.

In the above-described exemplary embodiments, the descriptions have been given on the assumption of a digital camera as an example of an imaging apparatus for carrying out the present invention, but the imaging apparatus is not limited to this. For example, various imaging apparatuses such as a portable device including a digital video camera and a smartphone, a wearable device, and a security camera may be employed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-141408, filed Aug. 31, 2021, which is hereby incorporated by reference herein in its entirety.

What is claimed is:

1. An apparatus comprising:
    a detection unit configured to detect a flicker frequency of a subject light source by sampling an output signal of a sensor in first sampling processing;
    a determination unit configured to determine whether the detected flicker frequency falls within a detection target range, by sampling an output signal of the sensor in second sampling processing; and
    a control unit configured to perform control to notify a user in response to determination by the determination unit that the detected flicker frequency falls out of a detection target range in the first sampling processing,
    wherein, in response to determination that the detected flicker frequency falls within a detection target range, the control unit notifies a user of information about the flicker detection.

2. The apparatus according to claim 1,
    wherein, in the first sampling processing, sampling is performed at a first sampling frequency, and
    wherein, in the second sampling processing, sampling is performed at a second sampling frequency that is higher than the first sampling frequency.

3. The apparatus according to claim 2, wherein the second sampling frequency is a value based on a Nyquist frequency corresponding to the first sampling frequency.

4. The apparatus according to claim 1, wherein, in the second sampling processing, sampling more simply than the first sampling processing is performed.

5. The apparatus according to claim 4, wherein a number of samplings in a vertical direction of the sensor varies between the first sampling processing and the second sampling processing.

6. The apparatus according to claim 5, wherein the number of samplings in the vertical direction of the sensor is smaller in the second sampling processing than that in the first sampling processing.

7. The apparatus according to claim 5, wherein the number of samplings in the vertical direction of the sensor is larger in the second sampling processing than that in the first sampling processing.

8. The apparatus according to claim 1,
    wherein, in the case where the detected flicker frequency falls out of the detection target range, the control unit prompts a user to manually set a shutter speed, and notifies a user that the detected flicker frequency falls out of the detection target range.

9. A method comprising:
    detecting a flicker frequency of a subject light source by sampling an output signal of a sensor in first sampling processing;
    determining whether the detected flicker frequency falls within a detection target range, by sampling an output signal of the sensor in second sampling processing; and performing control to notify a user in response to determination in the determining that the detected flicker frequency falls out of a detection target range in the first sampling processing, wherein, in response to determination that the detected flicker frequency falls within a detection target range, the performing control notifies a user of information about the flicker detection.

10. The method according to claim 9, wherein, in the first sampling processing, sampling is performed at a first sampling frequency, and wherein, in the second sampling processing, sampling is performed at a second sampling frequency that is higher than the first sampling frequency.

11. The method according to claim 10, wherein the second sampling frequency is a value based on a Nyquist frequency corresponding to the first sampling frequency.

12. The method according to claim 9, wherein, in the second sampling processing, sampling more simply than the first sampling processing is performed.

13. The method according to claim 12, wherein a number of samplings in a vertical direction of the sensor varies between the first sampling processing and the second sampling processing.

14. The method according to claim 9, wherein, in the case where the detected flicker frequency falls out of the detection target range, the control unit prompts a user to manually set a shutter speed, and notifies a user that the detected flicker frequency falls out of the detection target range.

15. The method according to claim 10, wherein, in the case where the detected flicker frequency falls out of the detection target range, the control unit prompts a user to manually set a shutter speed, and notifies a user that the detected flicker frequency falls out of the detection target range.

16. A non-transitory computer-readable storage medium storing a program for causing a computer to perform a method, the method comprising:

detecting a flicker frequency of a subject light source by sampling an output signal of a sensor in first sampling processing;

determining whether the detected flicker frequency falls within a detection target range, by sampling an output signal of the sensor in second sampling processing; and performing control to notify a user in response to determination in the determining that the detected flicker frequency falls out of a detection target range in the first sampling processing, wherein, in response to determination that the detected flicker frequency falls within a detection target range, the performing control notifies a user of information about the flicker detection.

17. The non-transitory computer-readable storage medium according to claim 16, wherein, in the first sampling processing, sampling is performed at a first sampling frequency, and wherein, in the second sampling processing, sampling is performed at a second sampling frequency that is higher than the first sampling frequency.

18. The non-transitory computer-readable storage medium according to claim 17, wherein the second sampling frequency is a value based on a Nyquist frequency corresponding to the first sampling frequency.

19. The non-transitory computer-readable storage medium according to claim 16, wherein, in the second sampling processing, sampling more simply than the first sampling processing is performed.

20. The non-transitory computer-readable storage medium according to claim 16, wherein, in the case where the detected flicker frequency falls out of the detection target range, the control unit prompts a user to manually set a shutter speed, and notifies a user that the detected flicker frequency falls out of the detection target range.

* * * * *